United States Patent
Iverson et al.

(10) Patent No.: US 12,082,729 B2
(45) Date of Patent: Sep. 10, 2024

(54) SMART CONTAINER WITH INTERACTIVE, COLORED LIGHTS

(71) Applicant: HidrateSmart LLC, Henderson, NV (US)

(72) Inventors: Coleman Iverson, Minneapolis, MN (US); Alexander Hambrock, Chicago, IL (US); Paul Baird, Chicago, IL (US); Travis Heaver, Eagan, MN (US); Grant Fritz, Boulder, CO (US)

(73) Assignee: HidrateSmart LLC, Henderson, NV (US)

( * ) Notice: Subject to any disclaimer, the term of this patent is extended or adjusted under 35 U.S.C. 154(b) by 302 days.

(21) Appl. No.: 17/607,782

(22) PCT Filed: Apr. 30, 2020

(86) PCT No.: PCT/US2020/030822
§ 371 (c)(1),
(2) Date: Oct. 29, 2021

(87) PCT Pub. No.: WO2020/223540
PCT Pub. Date: Nov. 5, 2020

(65) Prior Publication Data
US 2022/0218137 A1    Jul. 14, 2022

Related U.S. Application Data

(60) Provisional application No. 62/840,476, filed on Apr. 30, 2019.

(51) Int. Cl.
*A47G 23/16*    (2006.01)
*A45F 3/18*    (2006.01)
(Continued)

(52) U.S. Cl.
CPC ............... *A47G 23/16* (2013.01); *A45F 3/18* (2013.01); *A47G 19/2227* (2013.01);
(Continued)

(58) Field of Classification Search
CPC ............... A47G 23/16; A47G 19/2227; A47G 2019/2238; A47G 2019/2244; A45F 3/18;
(Continued)

(56) References Cited

U.S. PATENT DOCUMENTS

| D67,447 S | 6/1925 | Eanepf |
| 2,224,319 A | 12/1940 | Schroyer |

(Continued)

FOREIGN PATENT DOCUMENTS

| BR | 102012003037 A2 | 9/2013 |
| CN | 2893410 | 4/2007 |

(Continued)

OTHER PUBLICATIONS

Amazon.com: Starbucks 2015 Stainless Steel Faceted Mug with Lid, Copper, 14 fl. oz, Kitchen and Dining, accessed at <https://www.amazon.com/Starbucks-2015-Stainless-Steel-Faceted/dp/B0155XB9DI/ref=pd_sim_79_1?encoding=UTF8&pd_rd_1=B0155XB9DI&pd_rd_r=6540YVCGKWGCN8MJF25D&pd_rd_w=MdeAk&pd_rd_wg=D4v7I&psc=1&refRID=6540YVCGKWGCN8MJF25DStarbucks 2015 Stainless Steel Faceted Mug, available date May 13, 2015, 6 pages.

(Continued)

*Primary Examiner* — Jacques M Saint Surin
(74) *Attorney, Agent, or Firm* — Smith Baluch LLP

(57) ABSTRACT

A smart container that includes a bottle or other container, a load cell, an accelerometer, a processor, and a colored light source. The container may be a liquid container, a pill container, or a food container. The colored light source may include one or more light-emitting diodes (LEDs) which can (Continued)

be programed to emit unique illumination patterns. The container may also include a speaker or motor to emit audio and vibrational notifications. The container provides a method of tracking consumption by a user of a substance held in a container.

30 Claims, 22 Drawing Sheets

(51) Int. Cl.
    *A47G 19/22*     (2006.01)
    *G01G 17/04*     (2006.01)
    *G01G 19/52*     (2006.01)
    *G01G 23/36*     (2006.01)
    *G01G 23/365*     (2006.01)
    *G08B 7/06*     (2006.01)

(52) U.S. Cl.
    CPC .............. *G01G 17/04* (2013.01); *G01G 19/52* (2013.01); *G01G 23/361* (2013.01); *G01G 23/365* (2013.01); *G08B 7/06* (2013.01); *A47G 2019/2238* (2013.01); *A47G 2019/2244* (2013.01)

(58) Field of Classification Search
    CPC .......... A45F 3/16; G01G 17/04; G01G 19/52; G01G 23/365; G08B 7/06; H04L 67/535; H04W 4/027; H04W 4/80
    USPC ............................................................ 177/1
    See application file for complete search history.

(56) References Cited

U.S. PATENT DOCUMENTS

| | | |
|---|---|---|
| D152,393 S | 11/1949 | Buckingham |
| D159,169 S | 6/1950 | Smith |
| 2,593,868 A | 4/1952 | Fowler |
| D184,976 S | 4/1959 | Bloch |
| D195,230 S | 5/1963 | Dubbs |
| 3,218,447 A | 11/1965 | Pardue |
| 3,473,682 A | 10/1969 | Studen |
| 3,872,994 A | 3/1975 | Hyde |
| 3,996,879 A | 12/1976 | Walton |
| D243,158 S | 1/1977 | Bolwell |
| 4,286,464 A | 9/1981 | Tauber et al. |
| D272,775 S | 2/1984 | Weissenburger |
| 4,450,722 A | 5/1984 | Keyes, IV et al. |
| 4,478,265 A | 10/1984 | DeMarco |
| 4,535,923 A | 8/1985 | Manke |
| 4,563,726 A | 1/1986 | Newcomb et al. |
| D289,356 S | 4/1987 | Tanaka |
| 4,708,273 A | 11/1987 | Grant |
| 4,746,028 A | 5/1988 | Bagg |
| 4,802,602 A | 2/1989 | Evans et al. |
| 4,860,684 A | 8/1989 | Al-Harbi |
| 4,877,119 A | 10/1989 | Hosking |
| 4,904,878 A | 2/1990 | Gipp et al. |
| 4,951,596 A | 8/1990 | Wallace, Jr. |
| D314,689 S | 2/1991 | Claudias |
| 5,100,017 A | 3/1992 | Ishinabe et al. |
| D326,813 S | 6/1992 | Gavala, Jr. et al. |
| D333,066 S | 2/1993 | Kimpson |
| 5,184,510 A | 2/1993 | Rossman |
| D350,457 S | 9/1994 | Bailey |
| 5,356,012 A | 10/1994 | Tang et al. |
| D353,336 S | 12/1994 | Caliendo et al. |
| D356,264 S | 3/1995 | Praturlon et al. |
| 5,400,907 A | 3/1995 | Chen |
| D358,967 S | 6/1995 | Knighton |
| D367,426 S | 2/1996 | Ruff |
| 5,492,246 A | 2/1996 | Bailey |
| 5,555,746 A | 9/1996 | Thompson |
| 5,607,078 A | 3/1997 | Nordberg et al. |
| 5,644,298 A | 7/1997 | Brooks et al. |
| D386,407 S | 11/1997 | Gutting et al. |
| 5,789,675 A | 8/1998 | Blaine et al. |
| 5,793,184 A | 8/1998 | O'Connor |
| 5,808,200 A | 9/1998 | Dam |
| 5,823,496 A | 10/1998 | Foley et al. |
| 5,845,777 A | 12/1998 | Najmi |
| 5,860,387 A | 1/1999 | Giveen |
| D404,969 S | 2/1999 | Krenzler |
| 5,879,068 A | 3/1999 | Menashrov et al. |
| 5,881,597 A | 3/1999 | Brooks |
| 5,896,990 A | 4/1999 | Barzana |
| 5,897,013 A | 4/1999 | Manganiello |
| 5,915,580 A | 6/1999 | Melk |
| 5,944,238 A | 8/1999 | Stark |
| 5,979,698 A | 11/1999 | Deal |
| 6,016,764 A | 1/2000 | Giveen |
| 6,073,796 A | 6/2000 | Mogil |
| D435,454 S | 12/2000 | Munn et al. |
| 6,163,248 A | 12/2000 | Paek et al. |
| 6,192,752 B1 | 2/2001 | Blaine |
| 6,206,229 B1 | 3/2001 | Harjes |
| 6,212,803 B1 | 4/2001 | Key |
| 6,212,959 B1 | 4/2001 | Perkins |
| 6,252,494 B1 | 6/2001 | Howell |
| 6,254,247 B1 | 7/2001 | Carson |
| 6,457,616 B2 | 10/2002 | Gagne |
| D477,500 S | 7/2003 | Smith |
| 6,588,593 B2 | 7/2003 | Woskoski |
| D489,571 S | 5/2004 | Lee |
| 6,741,180 B2 | 5/2004 | Lassota |
| 6,749,319 B1 * | 6/2004 | Muse ...................... F21V 33/00 362/802 |
| 6,793,075 B1 | 9/2004 | Jeter |
| D498,144 S | 11/2004 | Illenberger et al. |
| 6,943,566 B2 | 9/2005 | Florin et al. |
| 6,990,860 B1 | 1/2006 | Gillanders |
| 6,992,757 B2 | 1/2006 | Holcomb et al. |
| 7,004,105 B2 | 2/2006 | Bucksch |
| 7,344,508 B2 | 3/2008 | Surina |
| 7,493,232 B1 | 2/2009 | Surina |
| 7,581,640 B2 | 9/2009 | Lopez |
| 7,600,423 B1 | 10/2009 | Fluhler et al. |
| D605,950 S | 12/2009 | James et al. |
| D611,765 S | 3/2010 | George |
| D614,961 S | 5/2010 | Thomas et al. |
| 7,712,364 B2 | 5/2010 | Radhakrishnan et al. |
| 7,798,373 B1 | 9/2010 | Wroblewski et al. |
| D625,146 S | 10/2010 | George et al. |
| D629,653 S | 12/2010 | Gullickson et al. |
| 7,851,775 B2 | 12/2010 | Hoyt et al. |
| D649,879 S | 12/2011 | Gullickson et al. |
| 8,072,594 B1 | 12/2011 | McMahon |
| D655,580 S | 3/2012 | Kotani |
| D667,269 S | 9/2012 | Pallotto |
| 8,378,830 B2 | 2/2013 | Moran |
| 8,446,283 B2 * | 5/2013 | Pietrorazio ........... G01F 23/804 340/580 |
| 8,469,226 B2 | 6/2013 | Davies et al. |
| 8,550,269 B2 | 10/2013 | Lane |
| D695,069 S | 12/2013 | Lane |
| 8,689,989 B2 | 4/2014 | Lane |
| 8,690,014 B2 | 4/2014 | Haueter et al. |
| D712,265 S | 9/2014 | Tahara et al. |
| 8,907,796 B2 | 12/2014 | Sweeney et al. |
| 8,979,539 B1 | 3/2015 | Snyder |
| D726,012 S | 4/2015 | Simard |
| D726,498 S | 4/2015 | Bukhari et al. |
| D726,500 S | 4/2015 | Ke |
| D729,012 S | 5/2015 | Ke |
| D732,403 S | 6/2015 | King |
| D732,889 S | 6/2015 | Eyal |
| D732,892 S | 6/2015 | Keys et al. |
| 9,138,091 B2 | 9/2015 | Zhao et al. |
| D740,605 S | 10/2015 | Wodka et al. |
| 9,151,605 B1 | 10/2015 | Sweeney et al. |
| 9,182,090 B2 | 11/2015 | Muehlemann et al. |
| D744,778 S | 12/2015 | Wahl |

(56) References Cited

U.S. PATENT DOCUMENTS

| | | |
|---|---|---|
| D746,634 S | 1/2016 | Lapsker |
| 9,230,423 B2 | 1/2016 | Wu et al. |
| D751,338 S | 3/2016 | Seiders et al. |
| D751,339 S | 3/2016 | Seiders et al. |
| D751,340 S | 3/2016 | Seiders et al. |
| D751,341 S | 3/2016 | Seiders et al. |
| D752,381 S | 3/2016 | Wahl |
| 9,311,806 B2 | 4/2016 | Hazen et al. |
| 9,320,375 B2 | 4/2016 | Sweeney et al. |
| 9,327,960 B2 | 5/2016 | Sweeney et al. |
| D761,058 S | 7/2016 | Ou |
| D761,619 S | 7/2016 | Seiders et al. |
| D761,624 S | 7/2016 | McLean et al. |
| 9,380,897 B2 | 7/2016 | Pfeiffer et al. |
| 9,382,107 B2 | 7/2016 | Pfeiffer et al. |
| D763,622 S | 8/2016 | Shirley et al. |
| D769,063 S | 10/2016 | Sweeney |
| D774,833 S | 12/2016 | Likar |
| D774,837 S | 12/2016 | Seiders et al. |
| D780,578 S | 3/2017 | Lane et al. |
| D781,156 S | 3/2017 | Minakuchi et al. |
| D793,804 S | 8/2017 | Herbst et al. |
| 9,740,824 B2 | 8/2017 | Chang et al. |
| D799,320 S | 10/2017 | Goodwin et al. |
| 9,792,409 B2 | 10/2017 | Wernow et al. |
| D803,619 S | 11/2017 | Seiders et al. |
| D803,684 S | 11/2017 | Seiders et al. |
| D804,904 S | 12/2017 | Noveletsky et al. |
| D804,905 S | 12/2017 | Seiders et al. |
| D808,802 S | 1/2018 | Seiders et al. |
| D812,970 S | 3/2018 | Rane et al. |
| D815,892 S | 4/2018 | Nguyen et al. |
| D815,893 S | 4/2018 | Seiders et al. |
| D815,901 S | 4/2018 | Steinmann |
| 9,930,980 B2 | 4/2018 | Pau |
| 9,932,980 B2 | 4/2018 | Czerwonka |
| D818,309 S | 5/2018 | Gomez |
| D821,809 S | 7/2018 | Rane et al. |
| D824,212 S | 7/2018 | Seiders et al. |
| 10,034,580 B2 | 7/2018 | Seiders et al. |
| 10,124,942 B2 | 11/2018 | Seiders et al. |
| D834,881 S | 12/2018 | Seiders et al. |
| D834,882 S | 12/2018 | Seiders et al. |
| 10,188,230 B2 | 1/2019 | Hambrock et al. |
| 10,232,992 B2 | 3/2019 | Seiders et al. |
| 10,232,993 B2 | 3/2019 | Seiders et al. |
| D848,792 S | 5/2019 | Duvigneau |
| 10,329,061 B2 | 6/2019 | Dias et al. |
| D855,388 S | 8/2019 | Potter et al. |
| D855,402 S | 8/2019 | Steinmann |
| 10,390,659 B2 | 8/2019 | Tolman et al. |
| D861,415 S | 10/2019 | Seiders et al. |
| 10,501,246 B1 | 12/2019 | Bowles |
| D872,542 S | 1/2020 | Seiders et al. |
| D875,479 S | 2/2020 | Seiders et al. |
| D878,874 S | 3/2020 | Seiders et al. |
| D881,640 S | 4/2020 | Nichols et al. |
| 10,650,660 B2 * | 5/2020 | Johnson ............... A61J 1/18 |
| D886,525 S | 6/2020 | Seiders et al. |
| 10,669,081 B2 | 6/2020 | Sullivan et al. |
| 10,676,251 B2 * | 6/2020 | Krafft ............... B65D 51/24 |
| D889,913 S | 7/2020 | Seiders et al. |
| 10,717,569 B1 | 7/2020 | Bowles |
| D892,556 S | 8/2020 | Wang et al. |
| D893,262 S | 8/2020 | Wang et al. |
| 10,737,851 B2 | 8/2020 | Sullivan et al. |
| 10,751,259 B1 * | 8/2020 | Dutta ............... A61J 7/0472 |
| D896,572 S | 9/2020 | Nichols et al. |
| D897,146 S | 9/2020 | Lane et al. |
| D902,646 S | 11/2020 | Seiders et al. |
| D902,650 S | 11/2020 | Wang |
| D909,810 S | 2/2021 | Lin |
| D910,368 S | 2/2021 | McCabe et al. |
| D913,745 S | 3/2021 | Nichols et al. |
| D913,746 S | 3/2021 | Nichols et al. |
| 10,959,552 B2 | 3/2021 | Nichols et al. |
| 10,959,553 B2 | 3/2021 | Nichols et al. |
| D915,133 S | 4/2021 | Nguyen et al. |
| 11,001,422 B2 | 5/2021 | Seiders et al. |
| 11,013,353 B2 | 5/2021 | Hambrock et al. |
| 11,014,720 B2 | 5/2021 | Seiders et al. |
| D921,422 S | 6/2021 | McCabe et al. |
| D922,138 S | 6/2021 | Chen |
| D922,152 S | 6/2021 | Seiders et al. |
| 11,021,304 B2 | 6/2021 | Seiders et al. |
| D925,984 S | 7/2021 | Gispert |
| 11,129,499 B2 | 9/2021 | Tolman et al. |
| 11,142,380 B1 | 10/2021 | Bowles |
| D935,276 S | 11/2021 | Lane et al. |
| D944,596 S | 3/2022 | Hoffmann et al. |
| D951,700 S | 5/2022 | Chen |
| D955,818 S | 6/2022 | Ames |
| D961,993 S | 8/2022 | Bram et al. |
| D971,685 S | 12/2022 | Ames |
| 11,832,745 B2 | 12/2023 | Hambrock et al. |
| 2001/0015099 A1 | 8/2001 | Blaine |
| 2002/0129663 A1 | 9/2002 | Hoyt et al. |
| 2003/0085233 A1 | 5/2003 | Winkleman |
| 2004/0104237 A1 | 6/2004 | Thompson |
| 2004/0182870 A1 | 9/2004 | Rodgers |
| 2004/0232156 A1 | 11/2004 | Hogan et al. |
| 2005/0099304 A1 | 5/2005 | Humphrey |
| 2005/0229699 A1 | 10/2005 | Chai et al. |
| 2005/0252290 A1 | 11/2005 | Eguchi et al. |
| 2005/0284219 A1 | 12/2005 | Kalix et al. |
| 2006/0000277 A1 | 1/2006 | Pietrorazio |
| 2006/0132351 A1 | 6/2006 | Le Sesne |
| 2007/0068249 A1 | 3/2007 | Eguchi et al. |
| 2007/0068944 A1 | 3/2007 | Mckinney et al. |
| 2007/0222619 A1 | 9/2007 | Moran |
| 2008/0035515 A1 | 2/2008 | Dikopf |
| 2008/0240997 A1 | 10/2008 | Kaiga et al. |
| 2008/0312363 A1 | 12/2008 | Fokken |
| 2009/0122523 A1 | 5/2009 | Rycroft |
| 2009/0139324 A1 | 6/2009 | Morimoto et al. |
| 2010/0000317 A1 | 1/2010 | Bron et al. |
| 2010/0001022 A1 | 1/2010 | McInerney |
| 2010/0124048 A1 | 5/2010 | Winters |
| 2010/0163567 A1 | 7/2010 | Chiang et al. |
| 2011/0149693 A1 | 6/2011 | Liao |
| 2011/0174993 A1 | 7/2011 | Blain |
| 2011/0265562 A1 | 11/2011 | Li |
| 2012/0094261 A1 | 4/2012 | Hayn et al. |
| 2012/0097567 A1 | 4/2012 | Zhao et al. |
| 2012/0103926 A1 | 5/2012 | Ibsies |
| 2012/0118059 A1 | 5/2012 | Reimer et al. |
| 2013/0059534 A1 | 3/2013 | Sobalvarro et al. |
| 2013/0216877 A1 | 8/2013 | Campbell |
| 2013/0275075 A1 | 10/2013 | Johnson |
| 2013/0319915 A1 | 12/2013 | Gellibolian et al. |
| 2013/0319966 A1 | 12/2013 | Lane |
| 2014/0003037 A1 | 1/2014 | Kuelzow et al. |
| 2014/0046596 A1 | 2/2014 | Chang et al. |
| 2014/0174173 A1 | 6/2014 | Chamberlin |
| 2014/0303790 A1 | 10/2014 | Huang et al. |
| 2014/0311239 A1 | 10/2014 | Marjanovic et al. |
| 2014/0341411 A1 | 11/2014 | Mohindra et al. |
| 2014/0354438 A1 | 12/2014 | Hazen et al. |
| 2014/0372045 A1 | 12/2014 | Keski-Pukkila et al. |
| 2015/0024349 A1 | 1/2015 | Bischoff et al. |
| 2015/0108026 A1 | 4/2015 | Azimi et al. |
| 2015/0122688 A1 | 5/2015 | Dias et al. |
| 2015/0182797 A1 | 7/2015 | Wernow et al. |
| 2015/0211729 A1 | 7/2015 | Mahlmeister et al. |
| 2015/0282654 A1 | 10/2015 | Kurabe et al. |
| 2015/0360927 A1 | 12/2015 | Sweeney et al. |
| 2016/0022209 A1 | 1/2016 | Fraisl |
| 2016/0025545 A1 | 1/2016 | Saltzgiver et al. |
| 2016/0083271 A1 | 3/2016 | Chen |
| 2016/0220184 A1 | 8/2016 | Manion |
| 2016/0286993 A1 | 10/2016 | Pau |
| 2016/0356641 A1 | 12/2016 | Larson |
| 2017/0156540 A1 | 6/2017 | Wheatley et al. |
| 2017/0267423 A1 | 9/2017 | Maruyama et al. |

(56) References Cited

U.S. PATENT DOCUMENTS

| | | | |
|---|---|---|---|
| 2017/0273488 A1 | 9/2017 | Lonis | |
| 2018/0125276 A1* | 5/2018 | Tsai | A47G 23/16 |
| 2018/0238536 A1 | 8/2018 | Xia et al. | |
| 2018/0350275 A1 | 12/2018 | Milbrandt et al. | |
| 2019/0125063 A1 | 5/2019 | Sengupta et al. | |
| 2019/0138874 A1 | 5/2019 | Tremblay et al. | |
| 2019/0174939 A1 | 6/2019 | Hoffmann et al. | |
| 2020/0029714 A1 | 1/2020 | Nguyen et al. | |
| 2020/0069090 A1 | 3/2020 | Bloom et al. | |
| 2020/0262624 A1 | 8/2020 | Qureshi-Arya | |
| 2021/0289964 A1 | 9/2021 | Hambrock et al. | |
| 2022/0218137 A1 | 7/2022 | Iverson et al. | |

FOREIGN PATENT DOCUMENTS

| | | | |
|---|---|---|---|
| CN | 101084417 A | 12/2007 | |
| CN | 101880450 A | 11/2010 | |
| CN | 102026566 A | 4/2011 | |
| CN | 102472656 A | 5/2012 | |
| CN | 103429500 A | 12/2013 | |
| CN | 103431995 A | 12/2013 | |
| CN | 103908131 A | 7/2014 | |
| CN | 104116377 A | 10/2014 | |
| CN | 303632204 | 4/2016 | |
| CN | 105934395 A | 9/2016 | |
| CN | 304173624 | 6/2017 | |
| CN | 107529874 A | 1/2018 | |
| CN | 108463202 A | 8/2018 | |
| CN | 217118247 U | 8/2022 | |
| CN | 307667443 | 11/2022 | |
| CN | 307667444 | 11/2022 | |
| DE | 10136236 A1 | 2/2003 | |
| DE | 10138063 A1 | 2/2003 | |
| EP | 0979989 A1 | 2/2000 | |
| FR | 2323130 A1 | 4/1977 | |
| HK | 22194570001 | 6/2022 | |
| HK | 22194570002 | 6/2022 | |
| HK | 22194570005 | 6/2022 | |
| JP | H10281852 A | 10/1998 | |
| JP | 2012533061 A | 12/2012 | |
| JP | D1488619 | 1/2014 | |
| KR | 101935263 B1 | 4/2019 | |
| NL | 1039558 C2 | 10/2013 | |
| TW | M548549 U | 9/2017 | |
| WO | 2011004319 A1 | 1/2011 | |
| WO | 2013181455 A1 | 12/2013 | |
| WO | 2016007464 A1 | 1/2016 | |
| WO | WO-2023015321 A1 * | 2/2023 | H01Q 1/22 |

OTHER PUBLICATIONS

Hi! It's time to drink more water, Hidrate PowerPoint Slides, Sep. 14, 2014, 15 pages.

Hidrate Kickstarter webpage accessed at <http://hidrate.me on Aug. 1, 2015 (retrieved from the Internet Archive on Jan. 19, 2016), 5 pages.

Hidrate Pitch Presentation PowerPoint slides, Sep. 14, 2014, 6 pages.

Hidrate website for ordering, accessed at <http://hidrate.me, on Sep. 7, 2015 (retrieved from the Internet Archive on Jan. 19, 2016) 4 pages.

HidrateMe Smart Water Bottle webpage, (captured at the Internet Archive on Sep. 11, 2015; https://web.archive.org/web/20150911052901/https://www.kickstarter.com/projects/582920317/hidrateme-smart-water-bottle/description; retrieved from the Internet Archive on Jan. 19, 2016), 34 pages.

Hidrate-Your Smart Waterbottle, accessed at <http://hidrate.me, on Mar. 27, 2015 (retrieved from the Internet Archive on Jan. 19, 2016), 5 pages.

International Search Report and Written Opinion in International Patent Application No. PCT/US2020/030822 mailed Jul. 31, 2020, 10 pages.

Meet MyHydrate—Hydration System & Smart Bottle Tracker, (retrieved from www.myhydrate.com on Jan. 19, 2016), 14 pages.

Office Action with translation dated Feb. 3, 2023, in Chinese Application No. 202080006020.3, 23 pages.

SANTECO Superlight Travel Mug, One-handed Operation with Safety Lock, Vacuum Insulated Bottle, 12oz, Quartz Pink, retrieved from https://www.amazon.com/SANTECO-Superlight-One-handed-Operation-Insulated/dp/B076CDWTPM on Aug. 13, 2019, 6 pages.

TechdotMN, Startup Weekend Twin Cities 6 final pitches, Sep. 16, 2014. Retrieved from https://tech.mn/news/2014/09/16/startup-weekend-twin-cities-6-final-pitches/, 11 pages.

U.S. Appl. No. 62/018,079, filed Jun. 27, 2014, Fraisl.

U.S. Appl. No. 62/162,510, filed May 15, 2015, Fraisl.

Hidrate Spark PRO Lite Smart Water Bottle Tritan Plastic, Tracks Water Intake & Glows to Remind You to Stay Hydrated—Chug Lid, 24 oz.-Fruit Punch, accessed at https://www.amazon.com/HidrateSpark-Bottle-Tritan-Plastic-Hydrated/dp/B09DTGY1NR?th=1 on Feb. 7, 2023, 2021, 8 pages.

Hidrate Spark PRO Smart Water Bottle accessed at: https://www.amazon.com/HidrateSpark-STEEL-Smart-Water-Bottle/dp/B08C1RCNWB on Feb. 7, 2023, 2020, 7 pages.

Hidrate Spark STEEL Smart Water Bottle Tracks Water Intake & Glows to Remind You to Stay Hydrated—Straw Lid, accessed at https://www.amazon.com/HidrateSpark-STEEL-Smart-Water-Bottle/dp/B08C1MLMJF/ref=cm_cr_arp_d_product_top?ie=UTF8&th=1&psc=1 on Feb. 7, 2023, 2020, 10 pages.

Hidrate Spark Virtual Tease. Hidratespark Instagram Jun. 19, 2020. 1 page.

Ion8 One Touch Sport Water Bottle accessed at: https://www.amazon.com/ion8-Proof-Water-Bottle-500ml/dp/B01L76THX6 on Feb. 7, 2023, 2017, 10 pages.

LifeStraw GO 650 ML water filter bottle accessed at: https:1/lifestraw.com/products/lifestraw-go on Feb. 7, 2023, 2021, 5 pages.

MOO Water Bottle Insulated Stainless Steel, accessed at: https://www.moo.com/US/drinkware/moo-water-bottle on Feb. 7, 2023, 2022, 12 pages.

Office Action with Search Report (with translation) in Chinese Application No. 202080006020.3, dated Oct. 12, 2023, 30 pages.

PRNEWSWIRE "Introducing HidrateSpark STEEL: The World's Smartest Water Bottle for Next Wave Hydration" accessed at: https://www.prnewswire.com/news-releases/introducing-hidratespark-steel-the-worlds-smartest-water-bottle-for-next-wave-hydration-301081772.html on Feb. 7, 2023, 2020, 2 pages.

Notice of Allowance and Search Report (with translation) in Chinese Application No. 202080006020.3, dated Apr. 18, 2024, 8 pages.

* cited by examiner

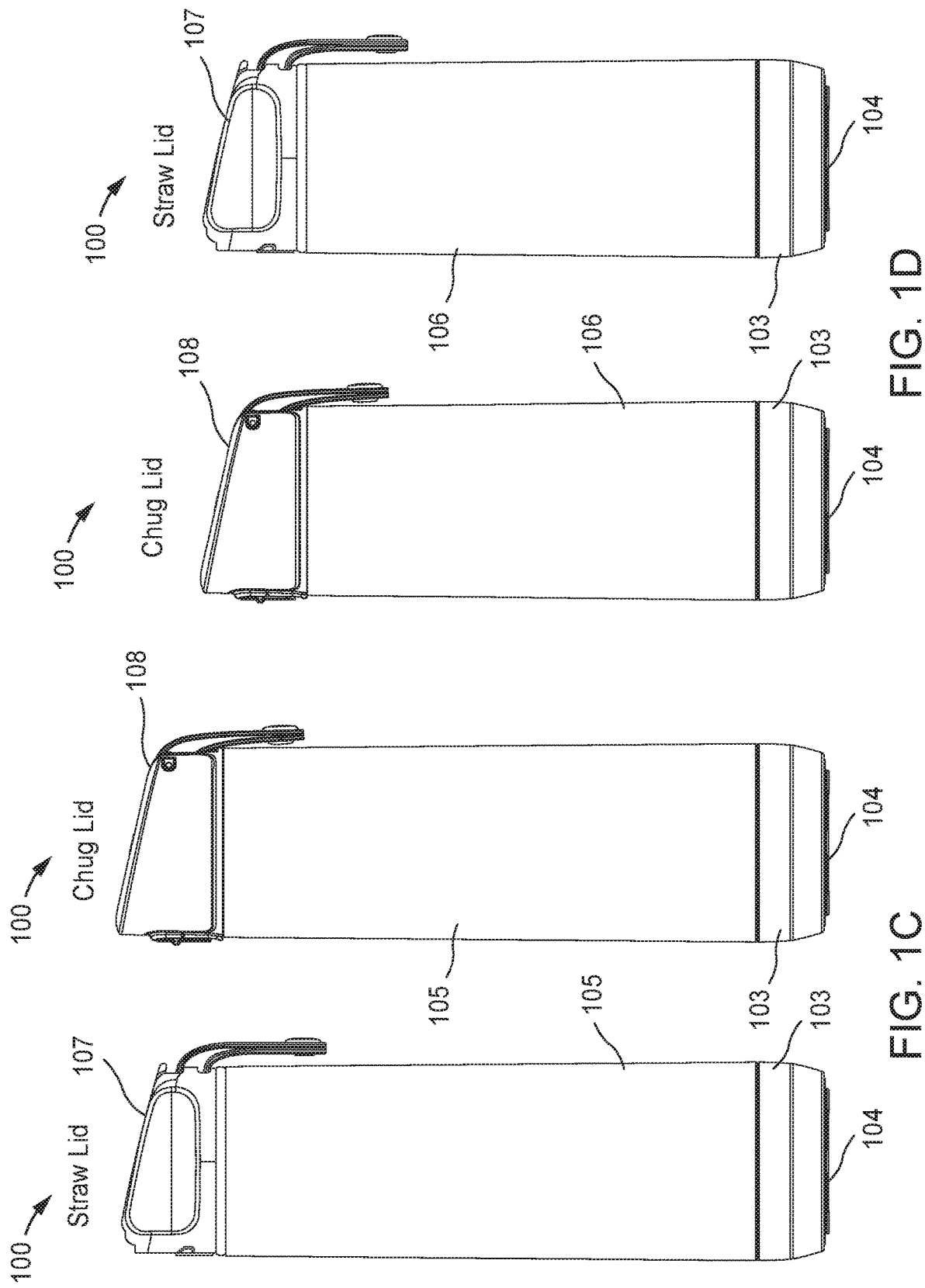

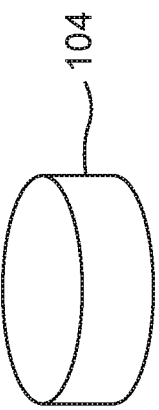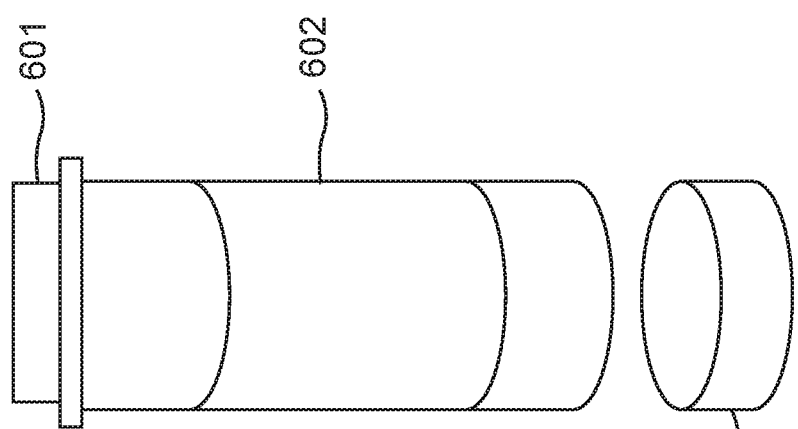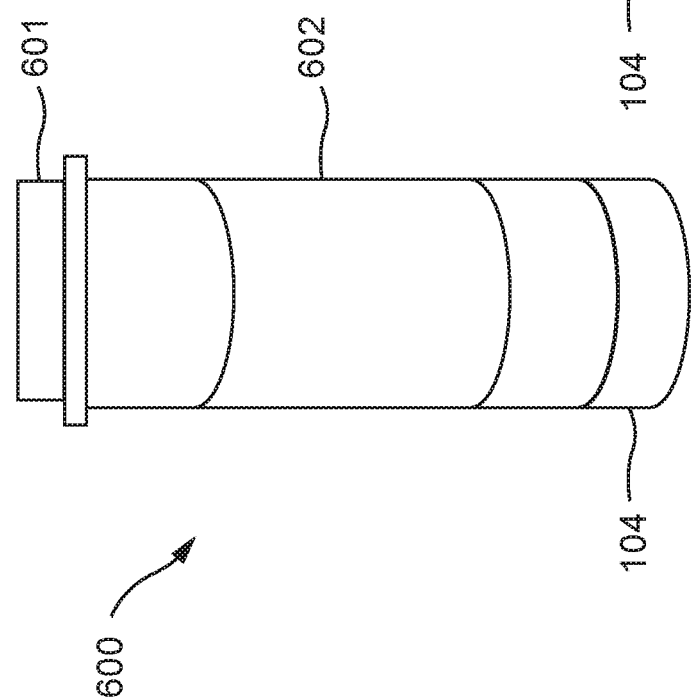

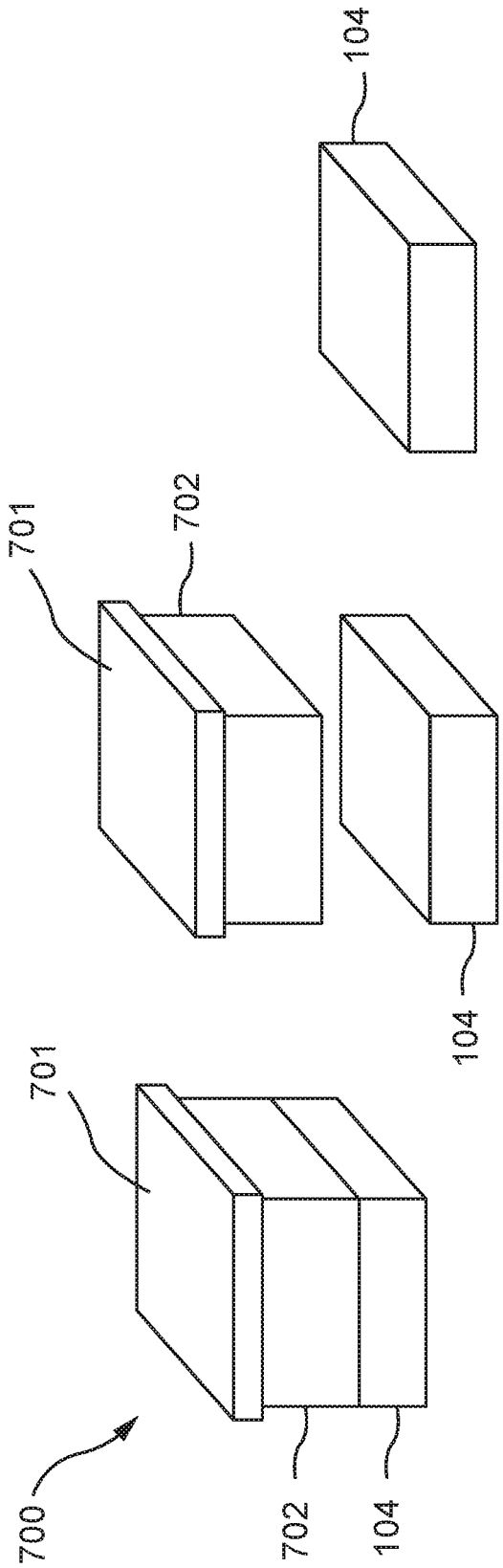

SMART CONTAINER WITH INTERACTIVE, COLORED LIGHTS

CROSS-REFERENCE TO RELATED APPLICATION(S)

This application is a U.S. national stage filing under 35 U.S.C. 371 of PCT/US2020/030822, filed Apr. 30, 2020, and entitled "Smart Container With Interactive, Colored Lights," which claims the priority benefit, under 35 U.S.C. § 119(e), of U.S. Application No. 62/840,476, entitled "Smart Water Bottle with Interactive, Colored Lights," filed on Apr. 30, 2019, the disclosure of which is incorporated herein by reference in its entirety.

BACKGROUND

Fitness trackers, such as smartwatches and fitness bracelets, are examples of devices that can monitor a user's physical activity throughout the day. These devices are developed to help users monitor their physical health and well-being while also allowing users to tailor the devices based on their preferences. Typically, these fitness trackers are connected to the user's smartphone, tablet, or another device such that the user can monitor his or her progress in an application.

While these smart devices can track the wearer's physical activities to better inform the wearer of his or her activity levels, there are still not many devices that can inform the wearer on other important aspects, for example, nutrition intake or hydration levels. Proper hydration is essential, but some studies show that over 75% of people have poor water consumption habits and fewer than 5% regularly consume enough water. Encouraging proper hydration can improve health and quality of life and promote healthy habits. Additionally, monitoring food intake or pill intake can help a user follow and track his or her nutritional or medical guidelines. Further, well-designed and well-built containers are more sustainable than single use containers.

SUMMARY

Embodiments of the present technology include a container assembly comprising a container, a load cell, an accelerometer, a processor, a colored light source, and a diffuser. The load cell is operably coupled to the container and measures a weight of contents of the container, which may hold liquid, pills, food, or another consumable substance. The accelerometer is operably coupled to the container and measures acceleration of the container. The processor is operably coupled to the load cell and the accelerometer and prompts the load cell to measure the weight of the contents of the container in response to the acceleration measured by the accelerometer. For instance, the processor may cause the load cell to measure the weight in response to an indication from the accelerometer that the container is upright.

The processor also determines a change in the weight of the contents of the container based on the weight of the contents of the container measured by the load cell. The colored light source is operably coupled to the processor and emits colored light. This colored light indicates the change in the weight of the contents of the container and/or prompts a user to consume at least a portion of the contents of the container. In some cases, the colored light source may comprise one or more colored light-emitting diodes (LEDs), which can be configured to emit unique illumination patterns.

The diffuser is in optical communication with the colored light source and diffuses the colored light over an area viewed by the user. The diffuser may be detachably or permanently attached to the container. It may contains a pair of concentric layers.

The load cell, the accelerometer, the processor, and the colored light source can form an assembly detachably coupled to the container. This assembly may also include a lower plate, an elastic membrane bonded to the lower plate, and a housing comprising an upper plate and a window disposed in front of the colored light source. The load cell can be held within the assembly by compressing the elastic membrane between the puck housing and the lower plate. This assembly may be water-tight or water-resistant.

The container assembly may also include a speaker configured to emit unique sound notifications, an actuator configured to emit unique vibration patterns, and/or an antenna operably coupled to the processor and configured to transmit data to, receive user preferences from, and/or receive commands from an external device. And the container assembly may include a radio-frequency identification (RFID) or near-field communication (NFC) tag, disposed in or on the container assembly, to communicate with an external device.

Another embodiment includes a method of tracking consumption by a user of a substance held in a container. This method includes measuring an acceleration of the container with an accelerometer coupled to the container and determining that the container is upright based on the acceleration. In response to determining that the container is upright, a weight sensor (e.g., a load cell) performs a measurement of a weight of the substance in the container with a load cell. A processor or other controller determines a change in the weight of the substance in the container based on the measurement of the weight of the substance. And a colored light source emits colored light via a diffuser coupled to a bottom of the container in response to the change in the weight of the substance in the container. This colored light source can be a water resistant or water-tight assembly that is detachably coupled to and can be removed from the container.

Yet another embodiment includes a bottle assembly comprising a container that may hold liquid, food, medication, or another consumable. The bottle assembly includes a ring-shaped translucent cap that is detachably coupled to a base of the container and may include a diffusive inner ring concentric with a translucent outer ring. The ring-shaped translucent cap forms a cavity at the base of the container and a cylindrical water-resistant or water-tight assembly detachably fit within the cavity.

The cylindrical water-resistant or water-tight assembly includes a load cell, an accelerometer, a processor, and colored lights. In operation, the load cell measures a weight of contents of the container, and the accelerometer measures acceleration of the container. The processor, which is operably coupled to the load cell and the accelerometer, prompts the load cell to measure the weight of the contents of the container in response to the acceleration measured by the accelerometer. The processor also determines a change in the weight of the contents of the container based on the weight of the contents of the container measured by the load cell.

The colored lights are operably coupled to the processor and disposed circumferentially about the cylindrical water-resistant or water-tight assembly. They emit colored light through the ring-shaped translucent cap in response to the change in the weight of the contents of the container. In some cases, the ring-shaped translucent cap diffuses the colored light emitted by the plurality of colored lights.

The cylindrical water-resistant or water-tight assembly may also include a base plate to support the load cell, a printed circuit board (PCB) to support the processor and the colored lights, and a housing fitting over the printed circuit board. The housing has transparent windows to transmit the colored light from the colored lights. And an elastic membrane compressed between the base plate and the housing creates a water-tight or water-resistant seal around the PCB and the load cell. The cylindrical water-resistant or water-tight assembly may also include a mid-plate held in place over the load cell and against the base plate by the elastic membrane. And it can include an RFID or NFC tag to communicate with an external device.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally and/or structurally similar elements).

FIG. 1B shows the smart container of FIG. 1A with the light puck inserted and turned on.

FIG. 1C shows a 21 oz smart water bottle with a stainless-steel double-wall vacuum insulated body with a chug lid (right) or straw lid (left).

FIG. 1D shows a 17 oz smart water bottle with a stainless-steel double-wall vacuum insulated body with a chug lid (left) or straw lid (right).

FIG. 6A shows a smart pill container.

FIG. 6B shows the pill container detached from the light puck of a smart pill container.

FIG. 6C shows a light puck for use in a smart pill container.

FIG. 7A shows a smart food container.

FIG. 7B shows the food container detached from the light puck of a smart food container.

FIG. 7C shows a light puck for use in a smart food container.

DETAILED DESCRIPTION

Figure 1A:
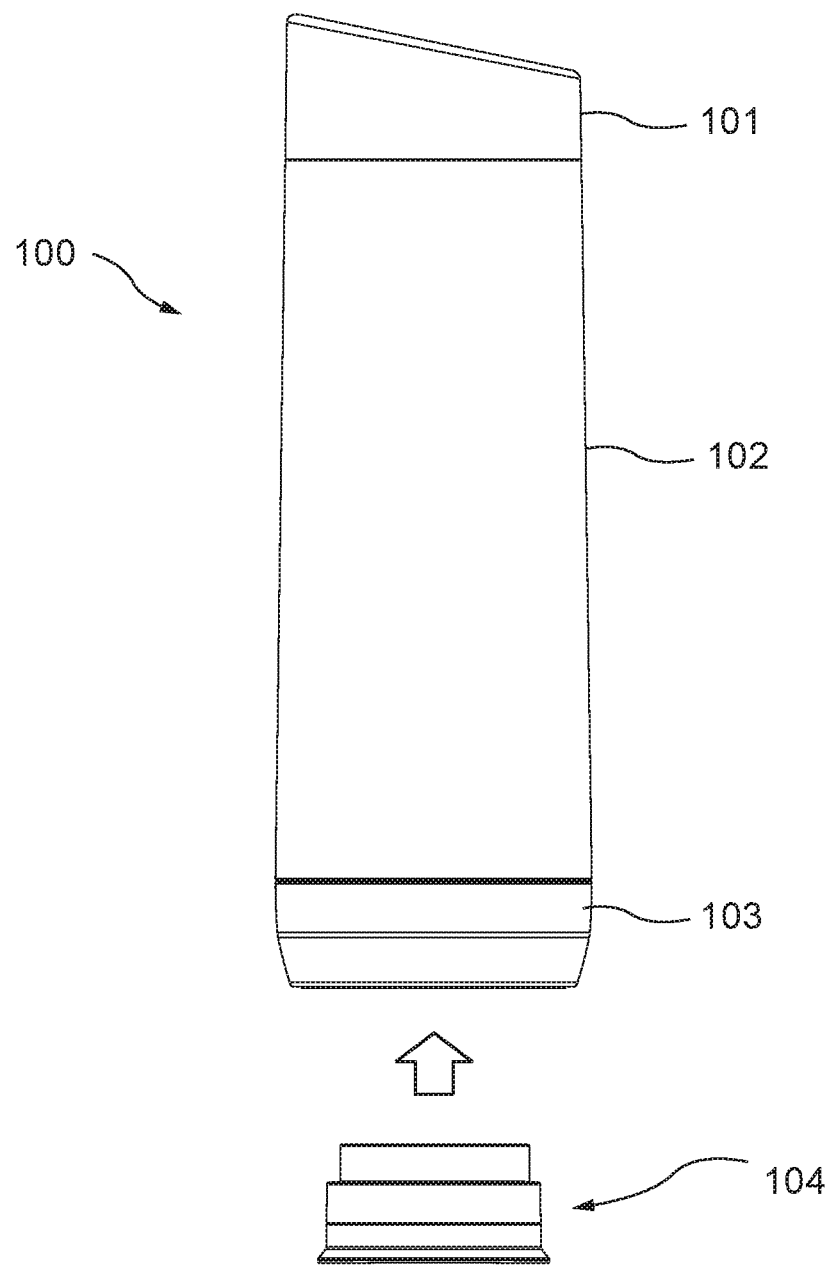
FIG. 1A shows a smart container with a flash cap and removable light puck.

The present disclosure describes embodiments of a smart container. The smart container contains multicolored lighting that can be used to convey a variety of messages to a user in an unobtrusive manner. The smart container may also contain a speaker to send audio messages or motor or actuator to send vibrational messages to the user.

The smart container may be a water bottle, a tumbler, a pill container, or a food container. The messages conveyed to the user can be simple or sophisticated, customizable or predefined, and can indicate information about contents or status of the smart container. The smart container may be plastic, glass, and/or metal. The container may be a variety of sizes including, but not limited to, 2, 5, 8, 10, 12, 14, 16, 17, 18, 21, 22, 24, 28, 32, 40, 64, or 128 ounces. When the container is a smart water bottle, the messages can indicate the user's progress toward a hydration goal or the smart water bottle status. When the container is a smart pill container, the messages can prompt the user to take a pill from the container or notify the user that a pill was taken from the container. When the container is a smart food container, the smart container can indicate information to the user regarding the consumption of the contents in the container or if the contents have expired.

The smart container may also be equipped with a Bluetooth, Wi-Fi, or cellular antenna, allowing the user to send and receive custom messages to and from other wireless devices. The smart container may also have RFID or NFC capabilities to track the user's preferences, the smart container's location, and/or to exchange information between the smart container and other devices. Users may program or control the messages conveyed or received by the smart container through an application on their phone, tablet, or other device wirelessly connected to the smart container(s).

Users can also send messages to each other via their smart containers, with the messages or displays optionally customized for each sender and/or recipient. Non-users can also send messages to the smart container, with the messages or displays optionally customized for each sender and/or recipient.

The smart container includes a processor that process messages and actuates and manages power consumption by the multicolored lighting. The processor controls battery draw, increasing power efficiency. The processor may also manage the color intensity and/or pulse frequency of light emitted by each colored light, since some colors may appear brighter than others, to provide desired glow sequences. The processor and electronics for the smart container are housed in a small rechargeable and removable puck that mechanically attaches to the smart container. The puck is interchangeable between smart containers and can be removed from the smart container for cleaning or replacement. The puck has an outer silicone membrane, which creates a seal when the puck is properly inserted into and secured to the base of a container. The seal may be water-tight or water-resistant and/or air-tight or air-permeable.

The colored lights can be arranged facing radially outward in the puck to produce smooth and uniform illumination from the bottom of the smart container. Light from the colored lights, which may include one or more LEDs, may diffuse through the housing to provide uniform illumination when the puck is assembled and coupled to the smart container. The multi-colored lights allow for a greater variety of messages and glow sequences to be conveyed to the user. For example, the lights may notify the user of the battery level of the smart container or of the status of the contents in the container.

Inventive smart containers have a number of advantages compared to existing smart water bottles. For instance, because the electronics of the smart container are housed in a water-tight puck, the user can clean the smart container without damaging the electronics. Additionally, because the puck is interchangeable between smart containers, the user can use one puck with a variety of containers based on user preference for container. The puck is rechargeable and can also be disassembled, allowing for the internal components to be re-used, repaired, or replaced, reducing waste.

Another advantage of inventive smart containers is the ability of the puck to take accurate measurements of either a liquid or solid substance in the container. For instance, the puck can be used to measure the weight of a liquid in a smart water bottle or the weight of pills in a smart pill container. In addition, the processor in the puck can record measurements with enough frequency to determine periods of inactivity of the smart container. By sensing periods of inactivity, the smart container may provide a warning to the user indicating the contents in the container are expired or should be replaced. The smart container may also record a user's progress and can be paired with another fitness tracker or fitness monitoring system for comprehensive nutritional and/or medical monitoring.

Another advantage of the inventive smart container is the message sender or receiver's ability to program the messages conveyed by the smart water bottle through the use of multi-colored lights, audio, or vibrations. For example, the multi-colored lights can be used to indicate that the user should drink from the smart water bottle. Alternatively, the multi-colored lights could indicate what pill the user should take (e.g., blue light for a blue pill or red light for a red pill). The smart container may also be equipped with a Bluetooth, Wi-Fi or cellular antenna allowing the user to send and receive custom messages from the user's phone, for example. The smart container can also convey messages from non-users, for example a health care professional prompting the user to take a pill from the smart container.

Smart Liquid Container

Figure 1B:
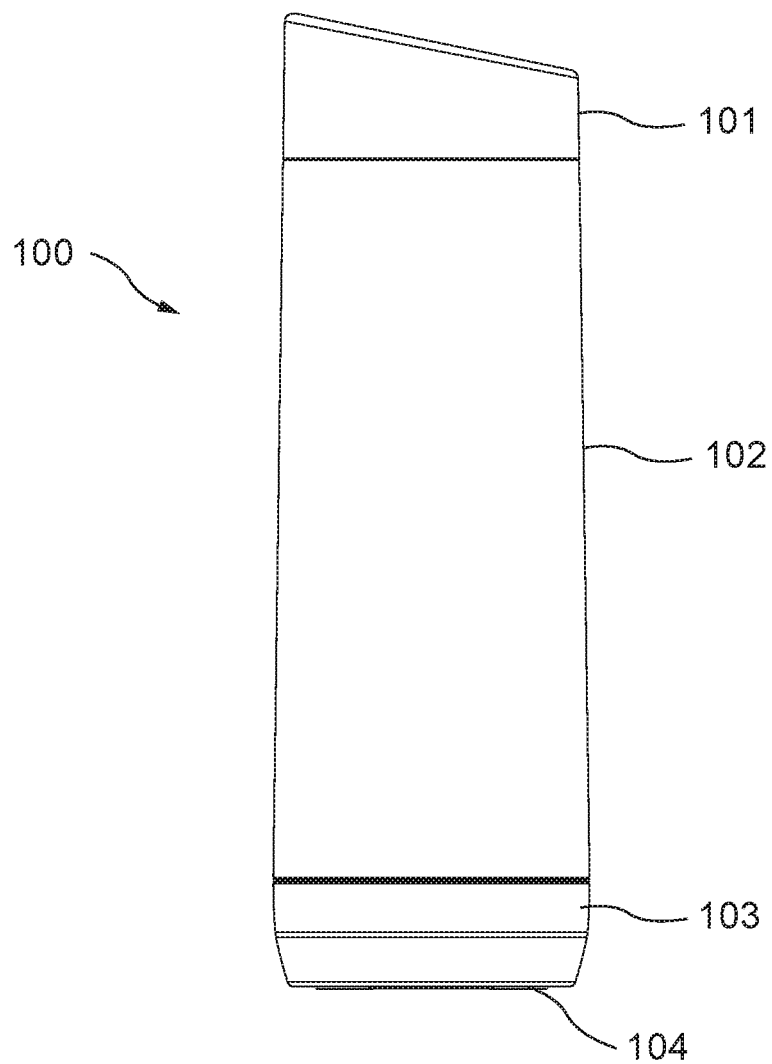

FIGS. 1A and 1B show a bottle assembly 100 that functions as a smart bottle to measure the weight of a liquid in a container 102 and to prompt to a user to drink a liquid from the container 102. The bottle assembly 100 contains a removable lid 101, a ring-shaped or annular flash cap 103 that is attached to the container 102, and a removable light puck 104 as shown in FIGS. 1A and 1B. The container 102 forms a cavity that can hold a liquid, such as water. The cavity may also be insulated to keep the liquid hot or cold. The container 102 and lid 101 can be made of plastic, glass, and/or metal. The plastic, glass, or metal may also be textured, patterned, colored, opaque, transparent, or translucent. The container 102 may come in multiple sizes, including, but not limited to, 12, 14, 16, 18, 22, 24, 28, 32, 40, 64, or 128 ounces.

FIGS. 1C and 1D show different sizes of a smart bottle 100. FIG. 1C shows a 21 oz container 105 and FIG. 1D shows a 17 oz container 106. The containers 105 and 106 are stainless-steel double-wall vacuum insulated. FIGS. 1C and 1D also show different removable lids 101 of a smart bottle 100. The removable lid 101 may screw or snap to the container 102 to prevent the liquid from leaking out of the container 102. For example, the removable lid 101 may include, but is not limited to, a chug lid 107, a straw lid 108, or a flip-top lid. The removable lid 101 may also have an attached carabiner or strap as shown in FIGS. 1C and 1D.

Figure 2A:
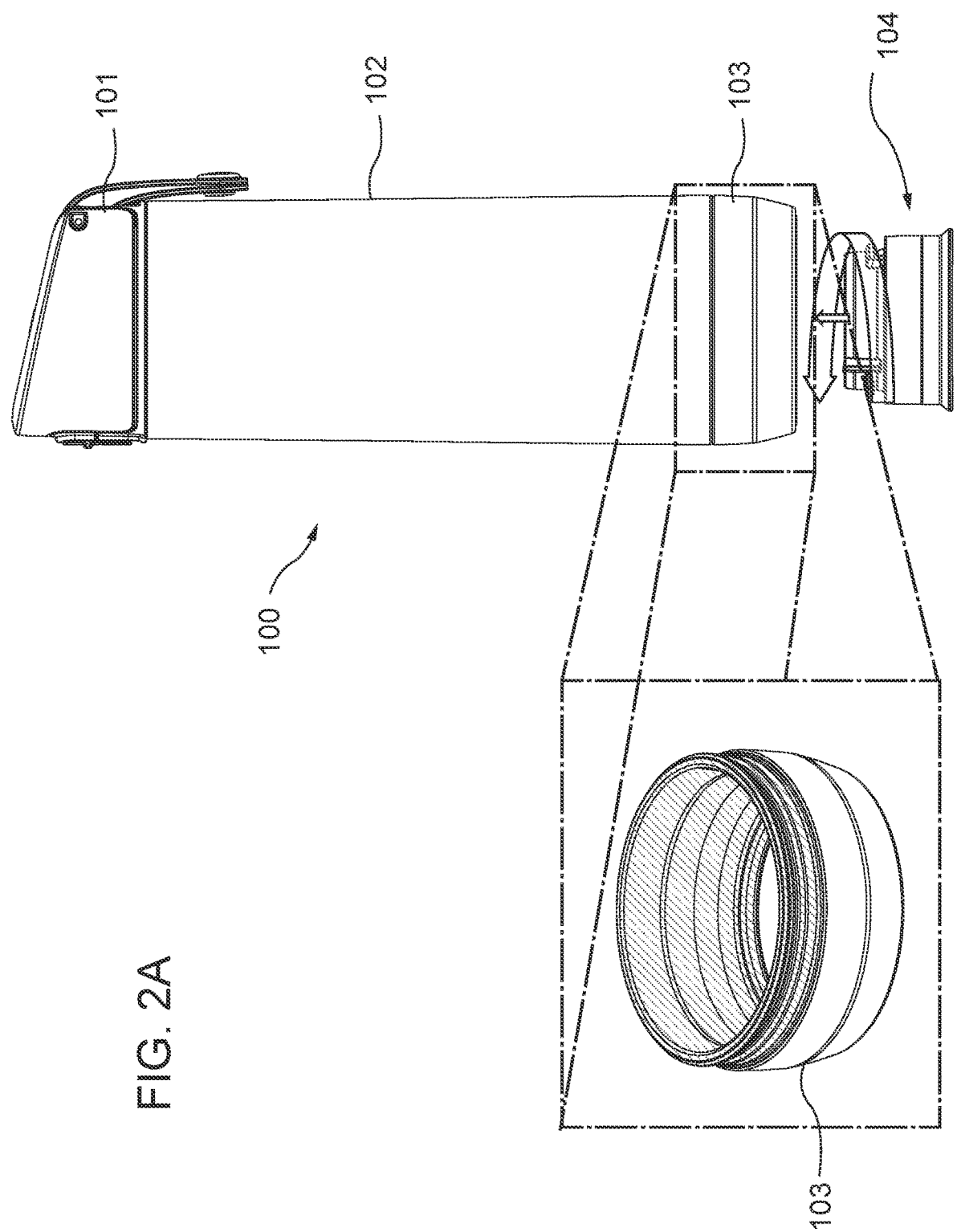
FIG. 2A shows the attachment of the light puck to the flash cap and smart container.
Figure 2B:
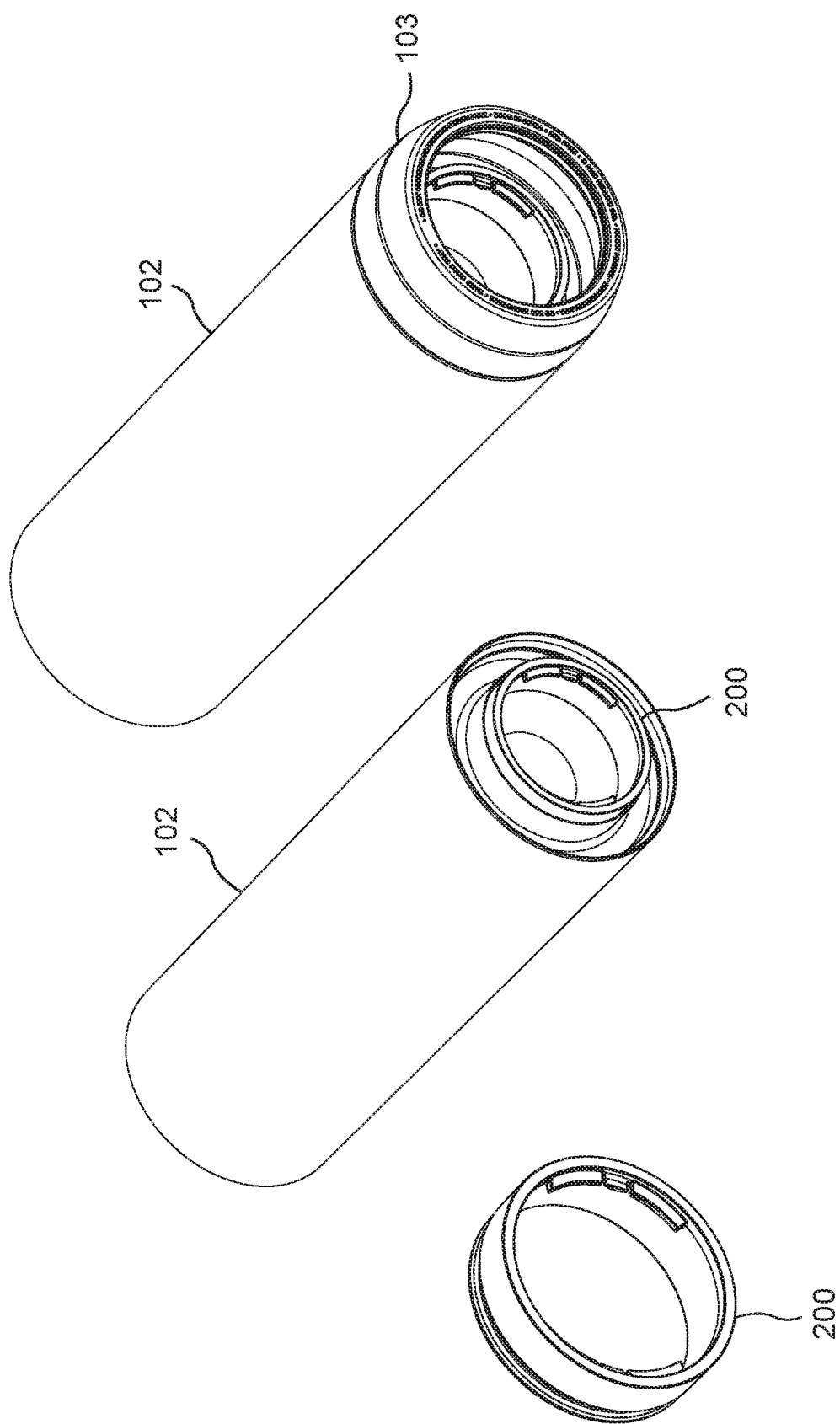
FIG. 2B shows the attachment of the flash cap and retainer ring to the smart container.

FIGS. 2A and 2B show the attachment of the light puck 104 and flash cap 103 to the container 102. FIG. 2A shows a cross section of the flash cap 103 and the attachment of the light puck 104 to the flash cap 103 and container 102. FIG. 2B shows the attachment of the flash cap 103 and retainer ring 200 to the container 102. The retainer ring 200 is molded out of a glass-filled polypropylene as shown in FIG. 2B (left). The retainer ring is permanently affixed to the underside container 102 via a press-fit and/or snap as shown in FIG. 2B (middle). The retainer ring 200 and flash cap 103 are each independently attached to the container 102 as shown in FIG. 2B (right). The flash cap 103 may be attached to the container 102 permanently via a one-time snap fit as shown in FIG. 2B (right). Alternatively, the flash cap 103 may screw or thread into the container and/or the retainer ring 200. The flash cap 103 may also be removably screwed onto or otherwise removably affixed to the container 102.

Figure 2C:
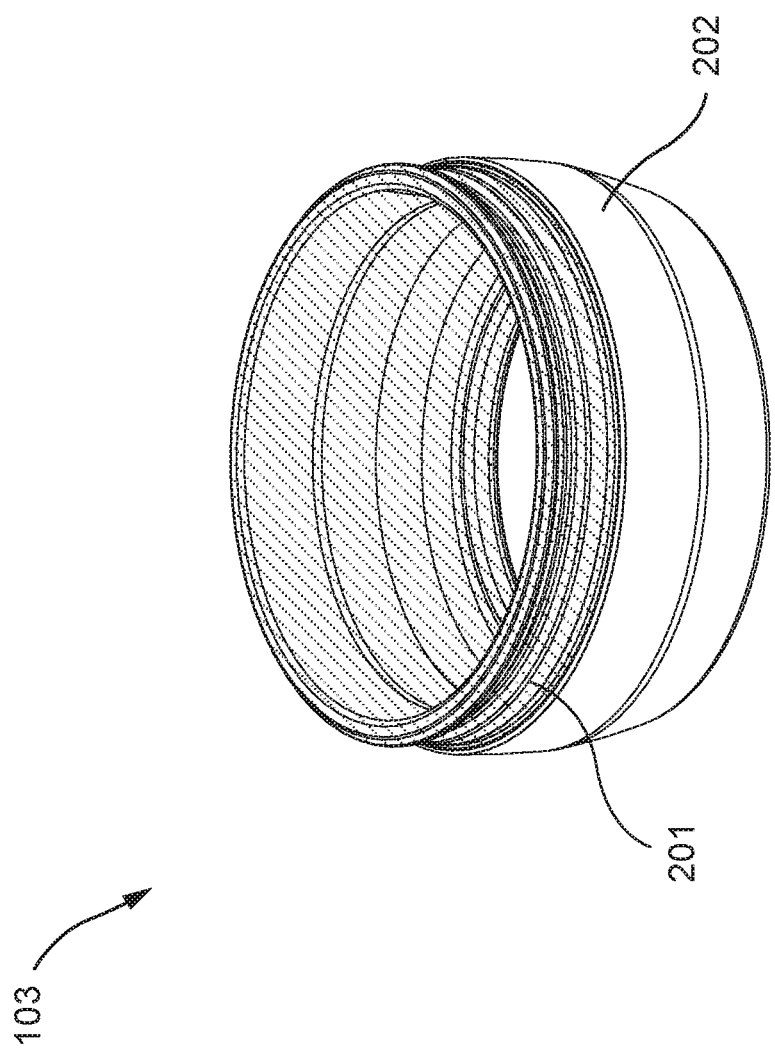
FIG. 2C shows a perspective view of the flash cap of the smart container.
Figure 2D:
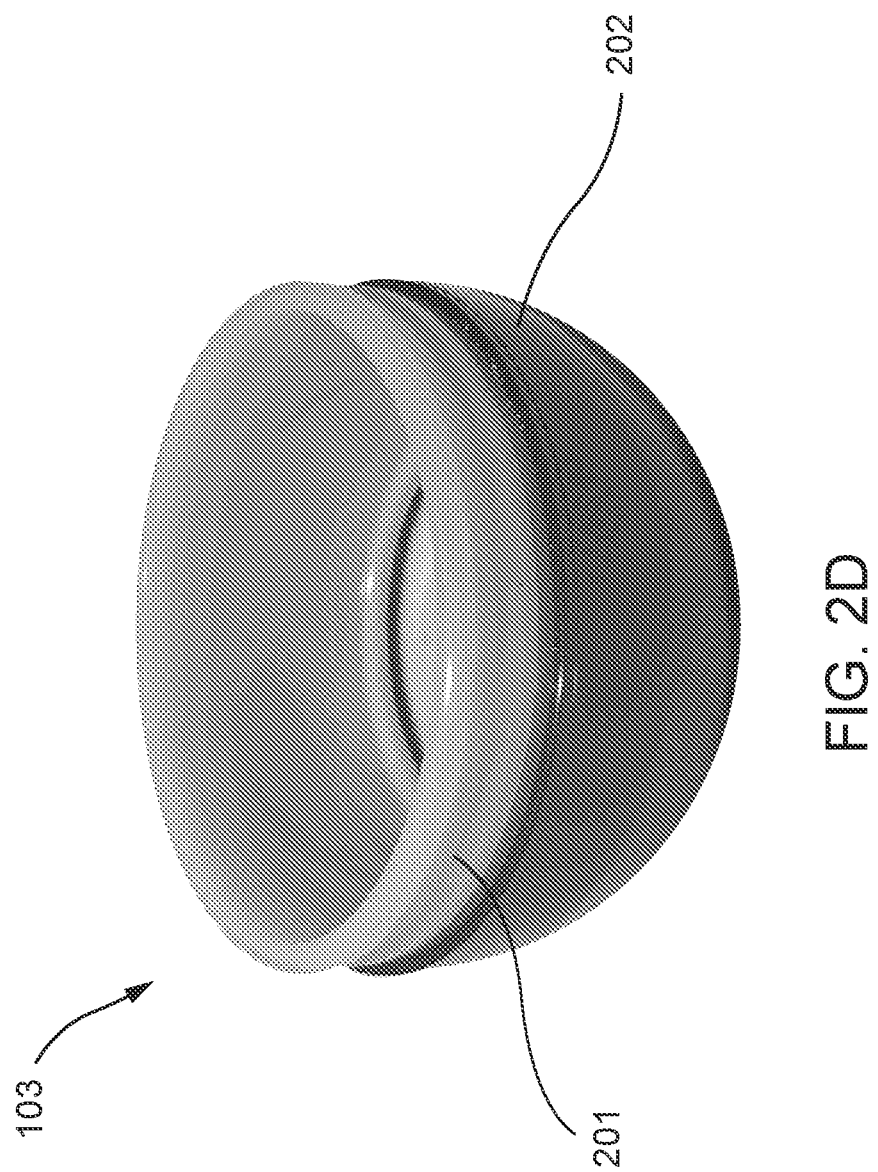
FIG. 2D shows a photograph of the flash cap of the smart container.

FIGS. 2C and 2D show different views of the flash cap 103, which is annular or ring-shaped. The flash cap 103 includes two polycarbonate rings, an inner ring 201 and an outer ring 202 as shown in FIGS. 2C and 2D. The inner ring 201 may be more translucent or transparent than the outer ring 202. The inner ring 201 is cloudy or frosted in appearance; for example, it may be etched or frosted or may contain an additive, e.g., an arrogate glass bead additive, to increase diffusion and uniformity of light dispersion. The outer ring 202 is translucent and may be tinted, e.g., grey. The outer ring 202 is over-molded over the inner ring 201 resulting in a permanent bond. The flash cap 103 acts as a diffuser to diffuse the light, producing smooth and uniform light illumination for the user.

FIGS. 3A-3G show the features of the light puck 104 in greater detail. The light puck 104 is a removable, rechargeable, water-resistant or water-tight sub-assembly. The light puck 104 may also be air-tight or air-permeable. The light puck 104 is shaped like a hockey puck—that is, it is shaped like a cylindrical disk—but other light pucks may have other shapes. Its dimensions are selected so that it fits snugly into a cavity formed within the flash cap 103 at the base of the container 102 when the flash cap 103 is coupled to the container 102.

Figure 3A:
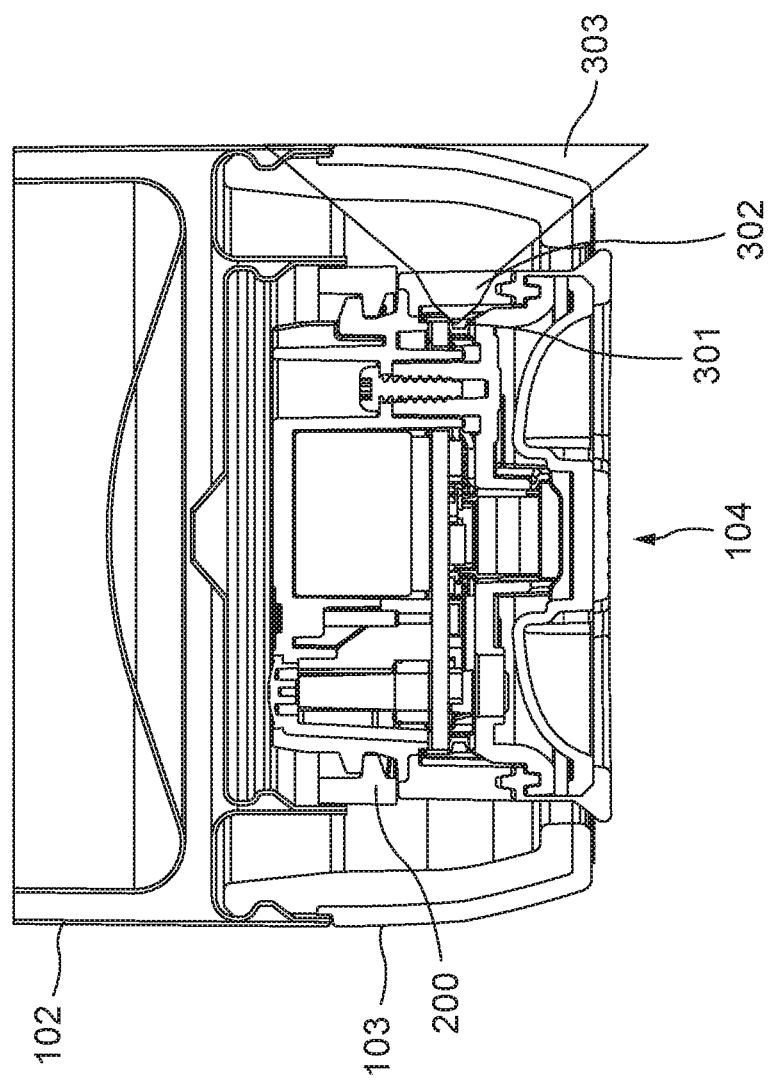
FIG. 3A shows a cross-section view of the light puck and the illumination from a light-emitting diode (LED) in the light puck.
Figure 3B:
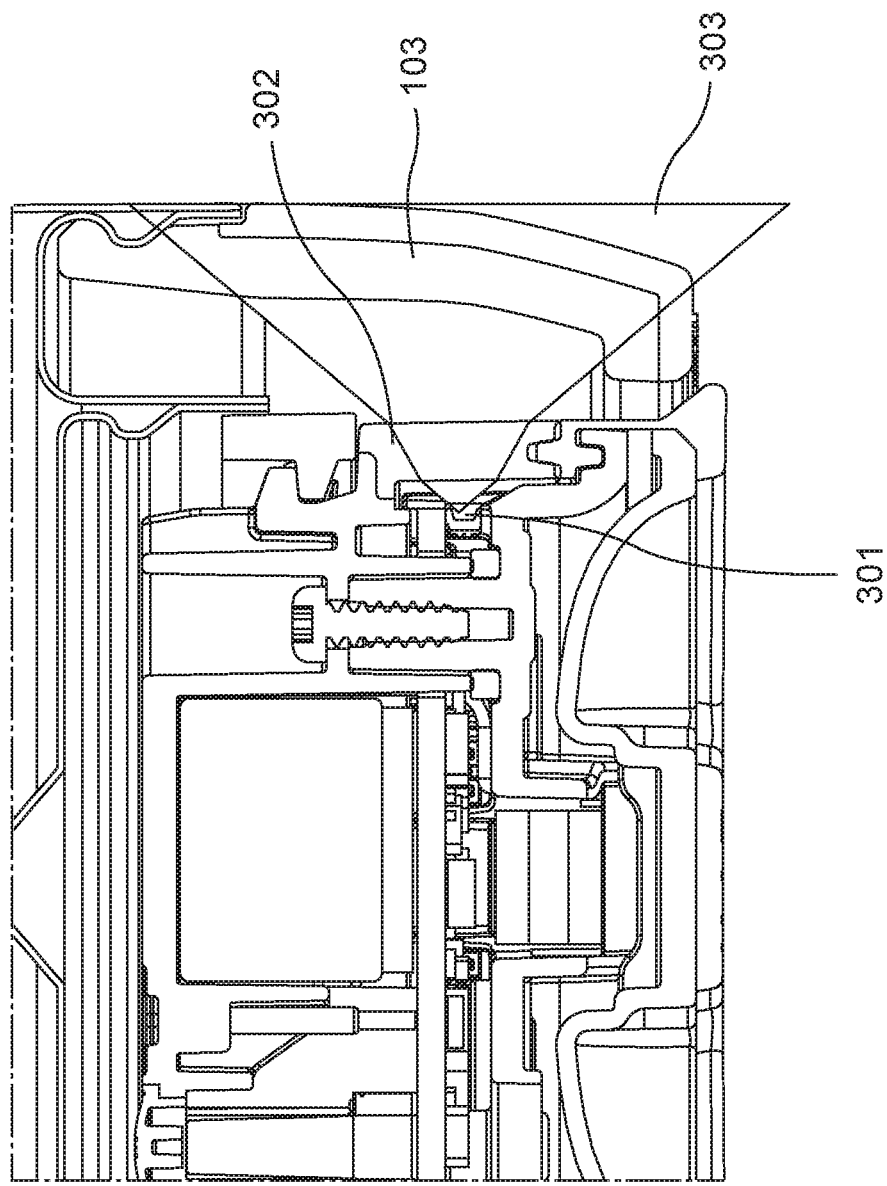
FIG. 3B is a close-up of FIG. 3A showing the illumination from a light-emitting diode (LED) in the light puck.

The removable light puck 104 allows for more accurate measurements and decreases the risk of water damage to the light puck electronics. FIG. 3A shows a cross section of the light puck 104. The light puck 104 may mechanically thread, screw, or snap to the underside of container 102 and/or the flash cap 103 via the retainer ring 200 as shown in FIG. 3A. As shown in FIGS. 3A and 3B, light from a colored visual indicator, such as one or more light emitting diodes (LEDs) 301, passes through the clear pass-through plastic window 302 of the light puck 104 and is cast evenly against the back of the flash cap 103. FIG. 3B is a close-up of FIG. 3A, illustrating the cone of light 303 from the LEDs 301 passing through the clear pass-through plastic window 302. The clear pass-through plastic window 302 is the wall of the light puck 104 and is positioned in front of the LEDs 301.

Figure 3C:
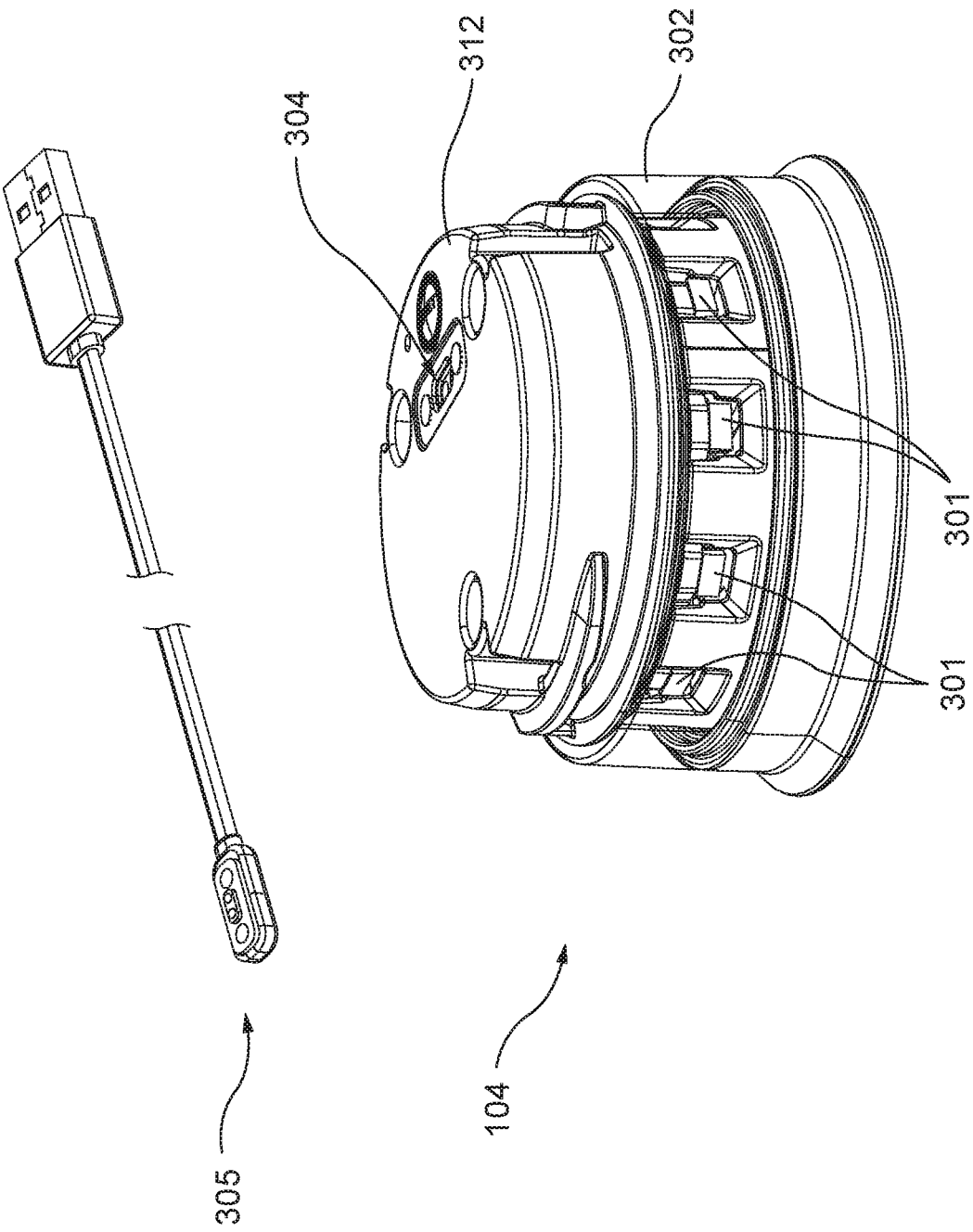
FIG. 3C shows a perspective view of the light puck and charger.
Figure 3D:
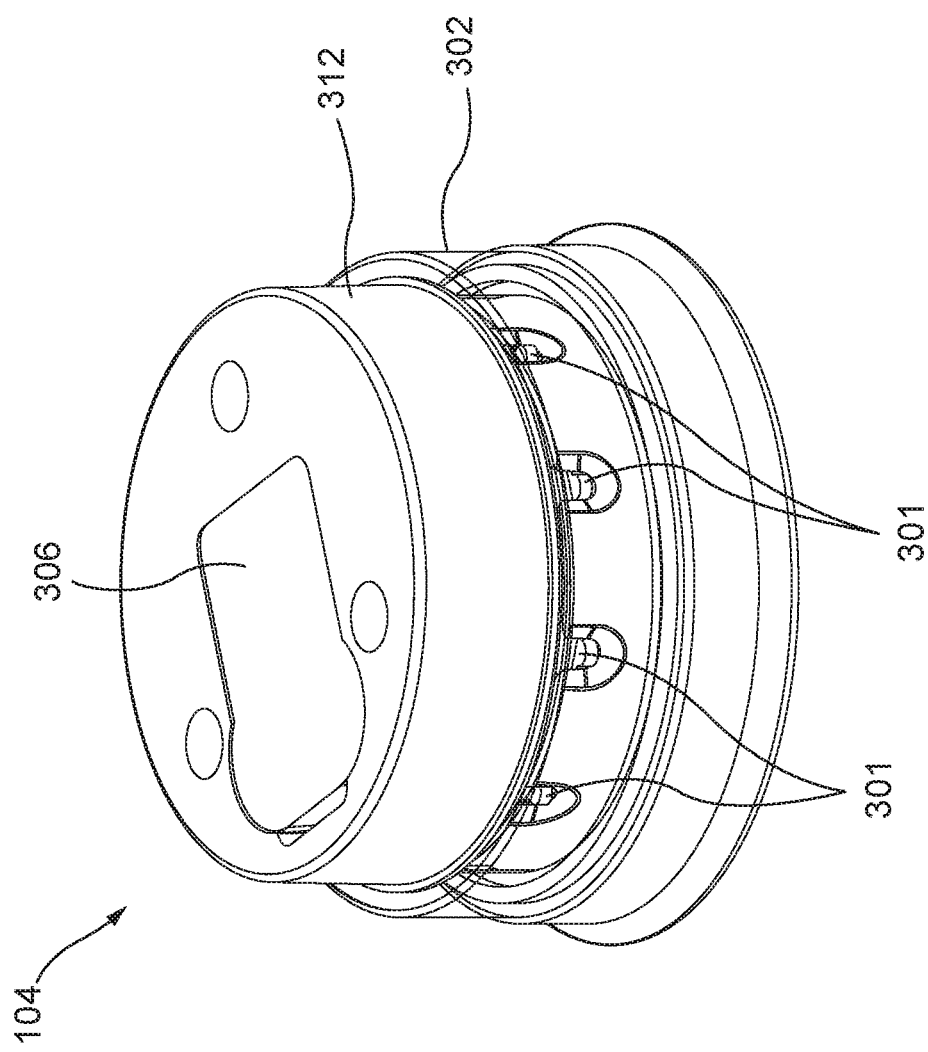
FIG. 3D shows a top view of the light puck with a charge part cover.

The LEDs 301 are mounted about the circumference of the light puck 104 as shown in FIGS. 3C and 3D. The LEDs 301 allow for a number of light patterns, chasers, back lit light patterns, or color combinations. The color, intensity, pattern, speed, or sequence of illumination from the LEDs 301 can be customized, e.g., through an application on the user's phone. The LEDs 301 can indicate a change in the weight of the contents in the container 102 or prompt to the user to drink or consume an item from the container 102. The LEDs 301 may further notify the user of specific situations, such as low battery, data synching, low content level, expired contents, the user's hydration level, and so on.

Compared to a white light or monochromatic light, the multi-colored LEDs 301 allow for a more effective way to communicate different messages, such as bottle state, battery level, and progress state, to the user. For example, the processor controlling the LEDs 301 can be programmed so that yellow indicates low battery, red indicates out of battery, and green indicates fully charged. The LEDs 301 can notify the user if they are behind pace, on track, or ahead of their hydration or consumption goal. For instance, the lights may be red or yellow if the user is behind pace, green if the user is on pace, or blue if the user is ahead of pace.

In addition to emitting multiple colors, the LEDs 301 can light up at different pulses or chasers ("chasing" lights of the same or different colors) to further help indicate the container state, battery level, and progress state. The LEDs 301 may also produce a celebration glow to indicate that the user's hydration or consumption goal has been met using a rainbow of colors. The colored LEDs 301 allow for greater user customization as the user can program unique patterns, such as chasing lights of one color or multi-colors or light colors to match the style and color of the smart container.

Additionally, the LEDs 301 may allow for custom reminders from other users with a smart container, possibly through an application on the user's phone. For example, the LEDs 301 may light up in a specific sequence or arrangement set by a friend, trainer, nutritionist, or healthcare provider who is sending a push reminder. This push reminder could be sent automatically by the friend's smart water container or smart phone app in response to detecting that the friend has been meeting or exceeding a fluid consumption target. Likewise, the smart container can automatically transmit push reminders that cause other smart containers to light up or make sounds. Users can also push messages to each other via their smartphones, tablets, or other devices wirelessly connected to the smart container(s) through the use of a Bluetooth, Wi-Fi, and/or cellular antenna.

FIGS. 3B and 3C show perspective views of the removable light puck 104. The light puck 104 contains a rechargeable battery. The light puck 104 may contain a magnetic charging port 304. The light puck 104 can be charged using a magnetic USB connector 305 as shown in FIG. 3C. Alternatively, the light puck 104 may include a charge port plug cover 306 as shown in FIG. 3D. The plug cover 306 may be made from silicone or another water-resistant or water-proof material. The light puck wall or puck top housing 312 may be made from metal or plastic and may have threads for engaging threads on the interior of the container or flash cap. The light puck 104 contains a clear pass-through plastic window 302 which allows the light from the LEDs 301 to be cast onto the back of the flash cap 103. The bottom of the light puck 104 is made of a silicone membrane or another water-resistant material.

Figure 3E:
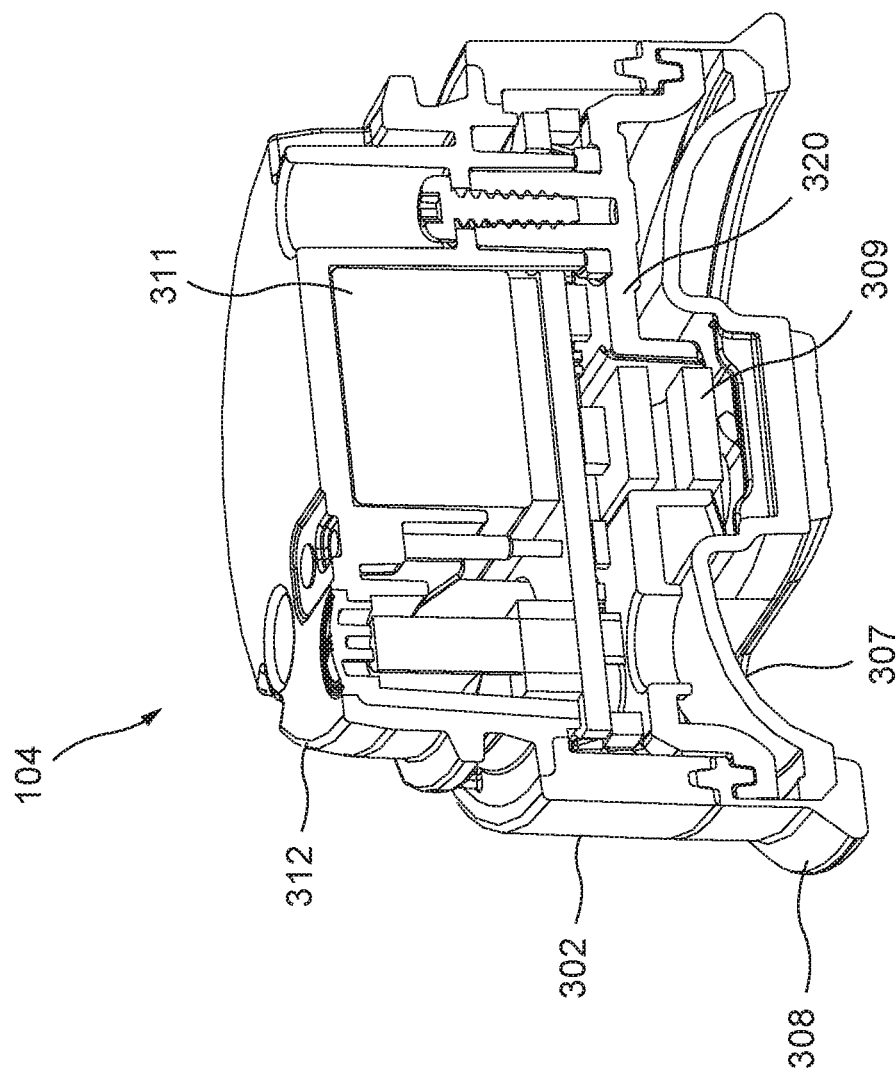
FIG. 3E shows a cross-section view of the light puck.

FIG. 3E shows a cross-section of the light puck 104. The light puck 104 contains an electronics assembly including a processor, one or more LEDs 301 on a printed circuit board (PCB) 320, a weight sensor or load cell 309, and an accelerometer. The load cell 309 may be made of aluminum or other metals. The load cell 309 may also be a resistive, inductive, pneumatic, or hydraulic load cell. The processor's functions include collecting the weight of the contents from the load cell 309, determining the acceleration and orientation of the bottle assembly 100 from the accelerometer, and actuating the LEDs 301 to notify the user of his or her consumption levels. The processor 310 may also be operably coupled to an antenna or a wireless connection for communicating with an external device, such as a smartphone.

In operation, the processor receives and stores the weight of the contents measured by the load cell 309 and the acceleration measured by the accelerometer. The data is stored in an internal or external memory (e.g., memory of a smart phone wirelessly connected to the smart container) and is used to determine the change in the weight of the contents in the container 102 to estimate or determine the user's consumption over a specified period. The processor notifies the user using the colored LEDs 301 of his or her consumption levels. The processor may also share data via a wireless connection with an external device, such as a smartphone, which can then be used to track the user's hydration or consumption levels over an extended period of time (e.g., a week or month). The user may also earn trophies, gifts, or points based on the user's progress in an application on the user's phone. The points can also be paired with another application or fitness monitoring system (e.g., Rally) to give the user a financial incentive. For example, the user may be able to use the points to receive a health insurance deduction from the user's employer. The processer has additional visual light reminders to communicate progress, power state, and product state for the user. Alternatively, the progress, power state, and product state can be communicated to the user through audio reminders through the use of speakers or vibration signals through the use of motors or other actuators.

The processor is operably coupled to the load cell 309, the accelerometer, the LEDs 301, the antenna, and the power source (battery). The processor prompts the load cell 309 to measure the weight of the contents in the container 102 in response to the acceleration measured by the accelerometer to determine a change in the weight of the contents in the container 102. The accelerometer measures the change in position of the bottle assembly 100 to determine the orientation and angle of the bottle assembly 100 and contents inside the container 102. The accelerometer and the load cell 309 can be prompted to take a measurement on a regular basis or at certain intervals to determine the orientation of the bottle assembly 100.

The accelerometer may be used to determine the bottle assembly's orientation, e.g., if the bottle assembly 100 is vertical. When the bottle assembly 100 is vertical and stable for a predetermined period (e.g., at least two seconds), the processor prompts the load cell 309 to take a measurement of the weight of the contents inside the container 102. When the bottle assembly 100 has been vertical for an extended period the load cell 309 may still take a measurement on a regular basis. The interval may be 1 second, 2 seconds, 5 seconds, 1 minute, 2 minutes, 5 minutes, 15 minutes, 30 minutes, 1 hour, 2 hours, 5 hours and so on. The interval may change based on the time of day, the user's schedule, and/or user preference through programming on an application on the user's phone.

Alternatively, the polling rate of measurements can be adjusted to save battery power. The accelerometer takes measurements with frequently enough that it can register repeated measurements of the same amount represent inactivity (i.e., the orientation of the bottle assembly 100 has not changed). The accelerometer may also provide a warning to the user that the contents of the smart container may be expired or that the contents should be changed after a period of inactivity. Temperature in the range of 0° Celsius to 100° Celsius is also measured and stored by the processor. This allows for a more accurate weight measurement by the load cell 309. Internal temperature information can also be used to offset effects of load-cell in accuracy from contracting or expanding air within a sealed light puck 104.

If the bottle assembly 100 is not vertical, the load cell 309 does not take a measurement because the load cell 309 may not be able to obtain an accurate measurement of the weight of the contents in the container 102. For example, if the container 102 is at an angle for a long period of time (e.g., while on a bike), the load cell 309 will not take any measurements. However, once the container 102 is placed on a flat surface, the load cell 309 measures the weight of the contents in the container 102. Alternatively, if the container is within a specified range of angles, the weight of the contents may be measured. Beyond a specified range, the weight of the contents may not be taken, or if it is taken, the contents weight may be adjusted to compensate for the orientation of the bottle assembly 100.

The load cell 309 can calibrated beforehand (e.g., at the factory) or by the user setting the bottle assemble 100 on a flat surface when the container 102 is empty. The user then places the bottle assembly 100 on a flat surface when the container 102 is full. These two values are stored in an internal or external memory and are used to create a correction curve of the load cell readings. The temperature of the contents in the container 102 can also be used to calibrate the load cell 309. The light puck 104 may also be calibrated by the user using an application on the user's device by establishing unloaded and fully loaded states of the container 102. The application may provide a warning to the user through light, vibration, or sound prompting the user to calibrate the smart container.

A self-correcting process implemented by the smart container's processor is further used to account for load cell drift over time or damage. With usage, the minimum and maximum load cell values may change. The processor recognizes any reasonable (e.g., not characteristic of mechanical or electrical failure, such as zero or 10 times the average value) load cell value larger than the maximum or less than the minimum. When this occurs, the minimum/maximum value is set to the new larger/smaller value. The processor also records high acceleration values measured by the load cell. If these high acceleration values are transient, they may indicate a drop or impact to the bottle assembly 100. Additionally, the processor records very high temperature and/or very cold temperatures as these may damage the load cell 309 and may prompt the user to re-calibrate the load cell 309.

A short history of accelerometer values is stored in an internal or external memory (e.g., the memory of a smartphone that communicates with the smart container). Several load cell readings are taken for each measurement to allow the weight to stabilize and account for any content movement. A short history of load cell values is also stored in an internal or external memory. The user's sip measurement is calculated as the starting load cell value minus the ending load cell value. These measurements are time stamped and can be stored in the memory. Each sip is time stamped down to the second of when the bottle 100 recognized the sip. For each sip, the time the sip was taken, the minimum load cell reading, the maximum load cell reading, the starting load cell reading value, the final load cell reading value, temperature, and load cell sensor input voltage can be stored in the memory.

Figure 3F:
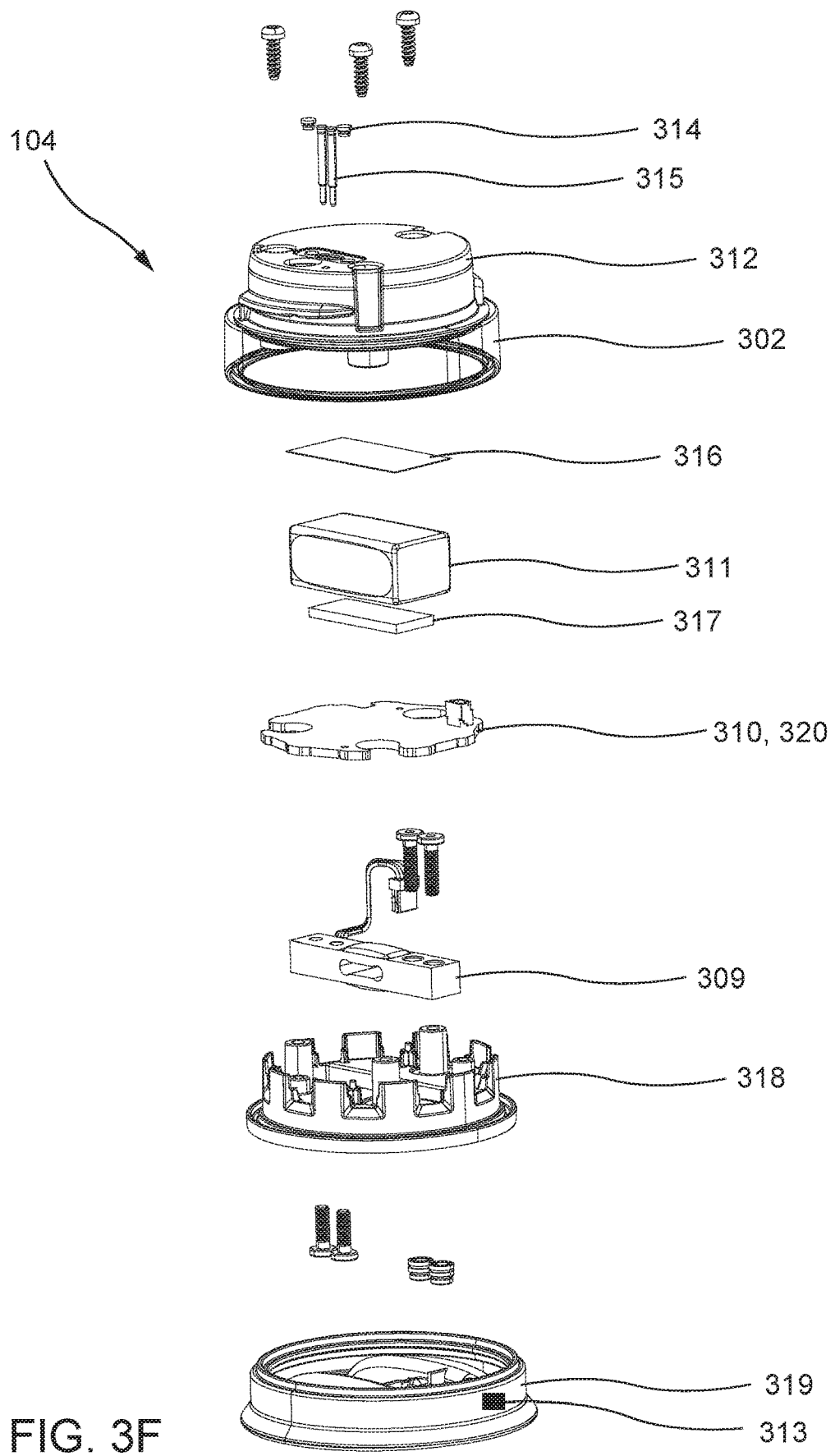
FIG. 3F shows an exploded view of the light puck.

FIG. 3F shows an exploded view of the components of the light puck 104. The light puck 104 includes a magnetic charging port including two ferromagnetic lugs 314 and plated pogo pins 315, the top housing 312, a clear pass-through plastic window 302, a protective insulation layer, e.g., fishpaper, 316, a rechargeable lithium battery 311, a foam pad adhesive 317, the PCB 320 with a processor 310 and multiple light sources, such as LEDs 301, a load cell 309, an upper plate 318, and a base plate 319. The protective insulation layer 316 prevents the processor 310 and other electrical components from contacting the battery 311. The light puck 104 may also include screws or over-molded metal inserts or be ultrasonically welded to connect the components. The clear pass-through plastic window 302 is over-molded to the puck housing 312 to form a permanent bond. The light puck 104 may also have a RFID or NFC tag 313. The RFID or NFC tag 313 may be attached to or embedded in the side or bottom of the base plate 319 as shown in FIG. 3E.

Figure 3G:
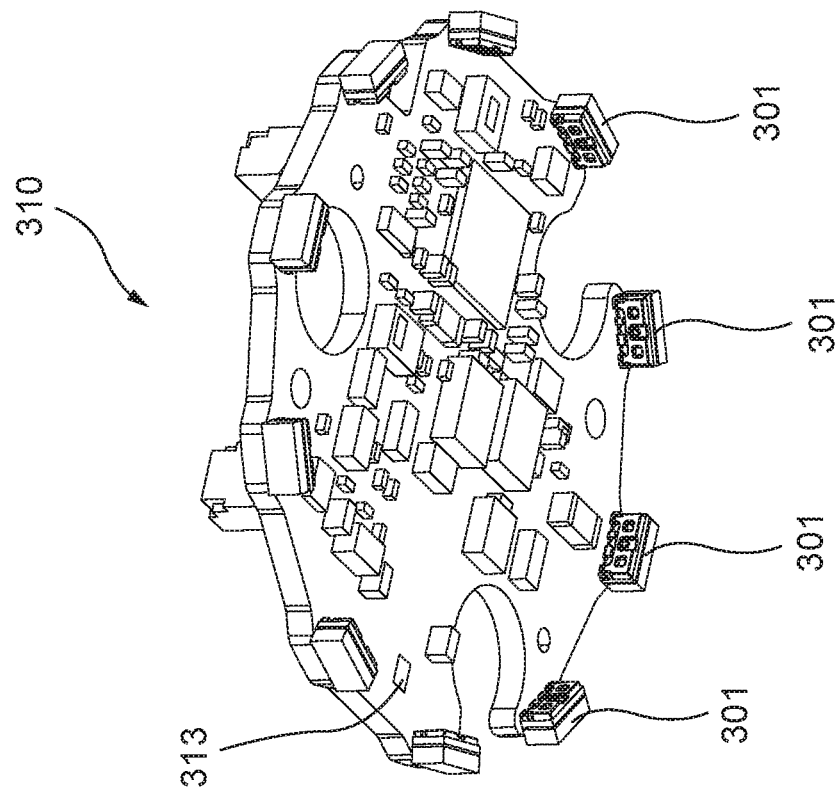
FIG. 3G shows a top (left) and underside (right) view of the printed circuit board and selected electronic components of the light puck.
Figure 3G:
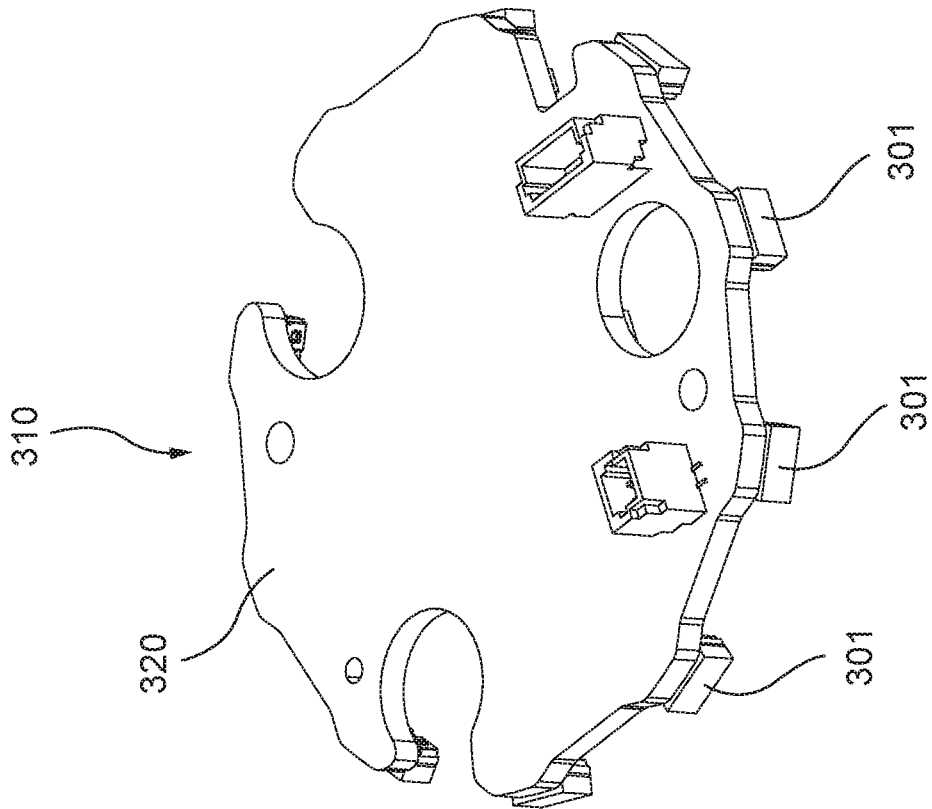

FIG. 3G shows a top (left) and underside (right) view of the processor 310, which is implemented here as one or more discrete electronic components, including, e.g., a microcontroller or microcontroller chip, memory, power management, Wi-Fi or Bluetooth Low Energy antenna and circuitry, etc., mounted on the PCB 320 or other suitable substrate. The LEDs 301 are circumferentially mounted on the underside of the PCB 320. The processor 310 may control at least 10 circumferentially mounted color LEDs 301.If desired, the RFID or NFC tag 313 can be mounted on the PCB 320 for easier coupling to the processor 310.

The light puck 104 may also contain a speaker or other noise-producing device to further prompt the user to drink a liquid or consume an item from the container 102. This speaker could be programmed by the user for auditory reminders, via a user-created recording or a preset recording selected by the user. It can be used to indicate the progress of the user towards their hydration or consumption goal and to send reminders to the user to drink water or consume contents from the container 102. It can also be used to indicate battery level or bottle status indicators with voice-recorded indicators, such as "Your battery is low" or "You met your goal" or "10 more oz to go." A user can also send and/or receive custom auditory reminders via the smart container speaker. A user can also receive recorded audio that can be sent to the smart container from a non-user. For example, a user can receive an audio message from a health care professional prompting the user to take a pill from the smart container.

The light puck 104 may also have a motor or other actuator to further prompt the user through the use of vibrations. This motor could be programmed by the user for reminders via a user-created preset vibration notification. It can be used to indicate the progress of the user towards their hydration or consumption goal and to send reminders to the user to drink water or consume contents from the container 102. It can also be used to indicate battery level or bottle status indicators with various vibration patters, such as rapid vibrations, a single vibration, or pulsing vibrations.

The light puck 104 may also have Bluetooth, Wi-Fi, or cellular capabilities in the form of an antenna and suitable transmit and receive circuitry. The user can connect the smart container to a smartphone, tablet, or other device through a Bluetooth, Wi-Fi, and/or cellular antenna. The cellular connection may be through a cellular hub or a cellular data plan. The wireless connection allows the user to program custom audio, visual or vibration reminders the user's smart container(s) through an application on the user's device. The wireless connection allows the processor to transmit recorded measurement data to an external storage system, receive updated user preferences, or receive commands from an application on the user's phone or a non-user. Users can also push messages to each other via their smartphones, tablets, or other devices wirelessly 4/25/connected to the smart container(s).

The light puck 104 may also have RFID or NFC capabilities to track a user's preferences (e.g., beverage flavors when used with a beverage-dispensing machine), the contents being placed in the container (e.g., liquid, food, or pills), or specific information about the type and size of container that the light puck 104 is being inserted into. For example, the light puck 104 may have an RFID or NFC tag that recognizes a corresponding RFID or NFC tag on a beverage refill station to communicate user preferences or the contents in the smart container 102 for the sensor to automatically refill the container 102 with the user's preferred contents.

The RFID or NFC tag may also be used to communicate the status of the bottle and/or transmit data to an external device to track the user's hydration or consumption levels (e.g., when the smart container does not have Wi-Fi, cellular, or Bluetooth capabilities). For example, the user may tap a cell phone to the RFID or NFC tag once to indicate that the contents of the smart container have been consumed or twice to indicate that container has been refilled. The RFID or NFC tag may be located inside the puck (e.g., on the PCB 320 or on the base plate 319 of the light puck 104), on the smart container 102 (e.g., on a sleeve attached to the smart container), or on the lid 101 of the smart container 102. The RFID or NFC tag may be attached to the surface of the light puck 104 or it may be molded into the plastic itself The light puck 104 may also have a serial number to associate the light puck 104 with a particular user. The serial number may be stored in an application on the user's device and allows the user's data to be transferred between light pucks, for example, if the light puck 104 is replaced. The light puck 104 may also be disassembled to allow parts to be repaired, replaced, or re-used.

The light puck 104 is interchangeable between the smart container devices and is completely independent of the dispensing mechanism of the container 102. The light puck 104 may also come in multiple sizes to accommodate different smart container devices to ensure that the LED 301 spacing and intensity are uniform between devices. For example, a 32 oz smart container may use a different size light puck from a 12 oz smart container. The light puck 104 is compatible with any material (i.e., plastic, glass, or metal) based on user preference for the smart container. In one embodiment, the user may set the type and size of smart container through programming on an application on the user's phone. The user may set preferences (e.g., notifications) for each smart container in an application on the user's phone.

In another embodiment, the light puck 104 may be able to sense the type and size of the smart container and then the user confirms the pairing is correct in an application on the user's phone. For example, the light puck 104 may have an RFID or NFC tag that recognizes a corresponding RFID or NFC tag on the bottom of the container 102 which communicates information about the size and type of the smart container to the light puck 104. The light puck 104 can automatically determine the size and weight of the bottle allowing for simpler calibration. Alternatively, the light puck 104 may be able to sense the weight of the container and/or orientation of the sensor and choose the type and size of the smart container from a matrix of known combinations. There may also be a physical feature between the sensor and container that allows the light puck 104 to detect and identify the type and size of the smart container.

Figure 4B:
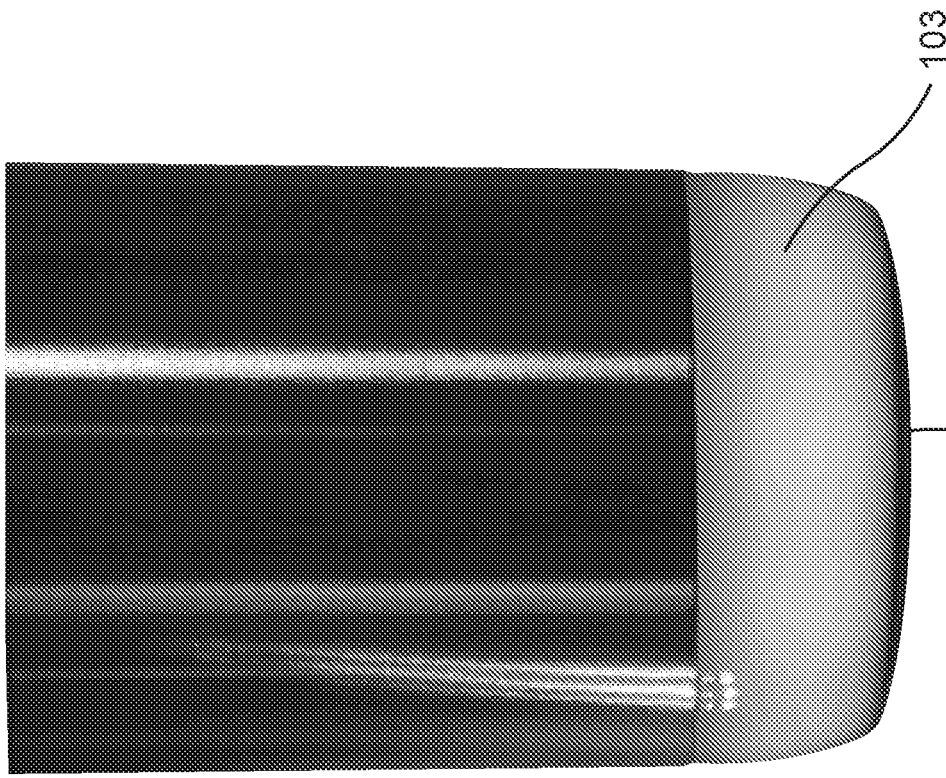
FIG. 4B shows the illuminated light puck and flash cap with a diffusion additive.
Figure 4A:
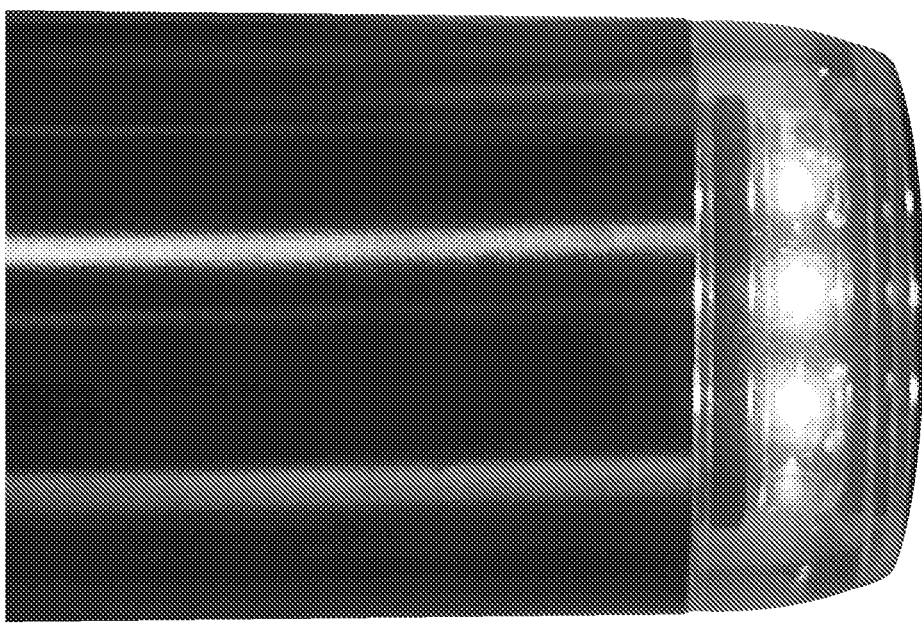
FIG. 4A shows the illuminated light puck and flash cap without a diffusion additive.

FIGS. 4A and 4B show two different views of the illuminated light puck 104 inside the flash cap 103—a view of the flash cap 103 without a diffuser additive (FIG. 4A) and a view of the flash cap 103 with a diffuser additive (FIG. 4B). In each view, the LEDs 301 are positioned circumferentially and emit light radially, facing outwards as shown in FIGS. 3C and 3D. In the left view, the light from the LEDs 301 is not uniformly distributed and the individual LEDs are visible 301 to the user. In the right view, the flash cap 103 and diffuser uniformly distribute the light from the LEDs 301, producing smooth and uniform light illumination for the user.

Figure 5A:
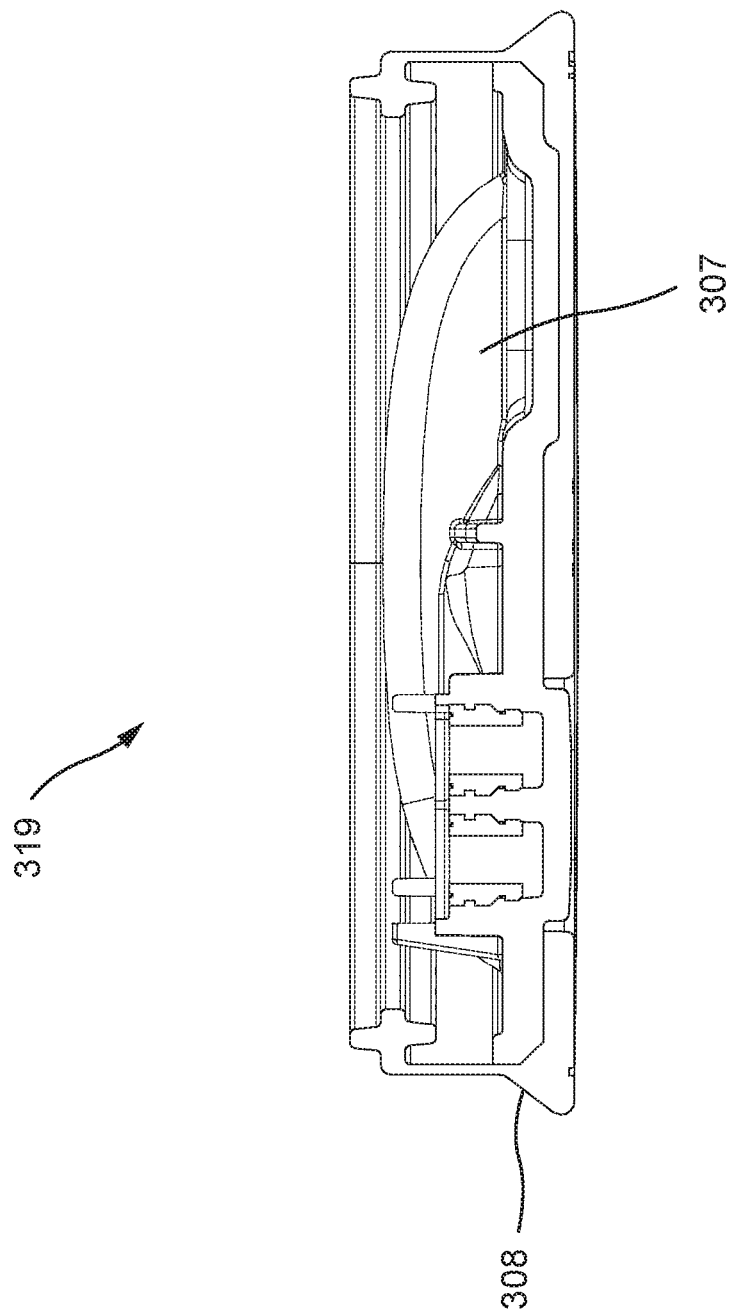
FIG. 5A shows the base plate of the light puck.
Figure 5B:
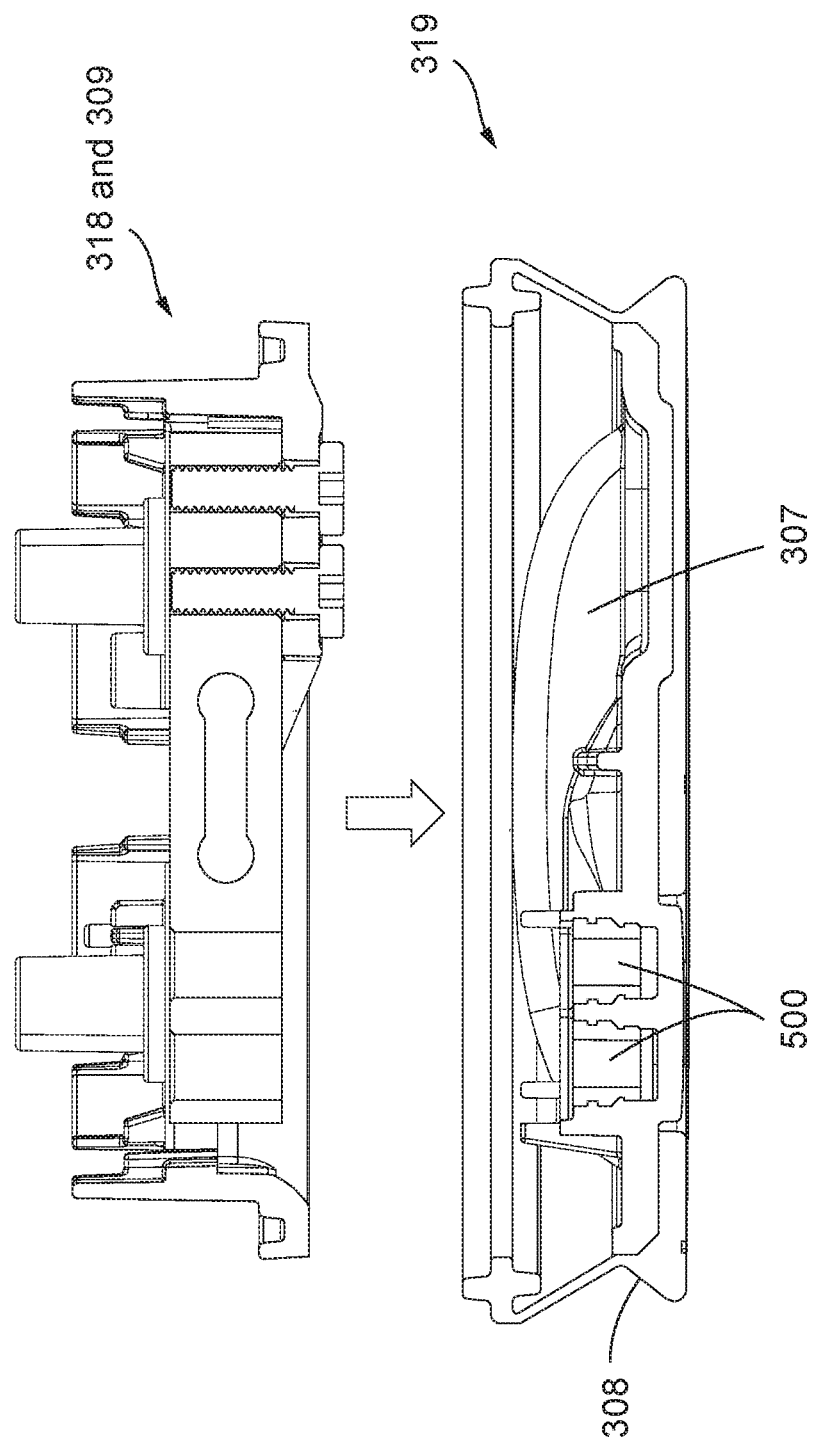
FIG. 5B shows the attachment of the load cell and upper plate assembly to the base plate of the light puck.
Figure 5C:
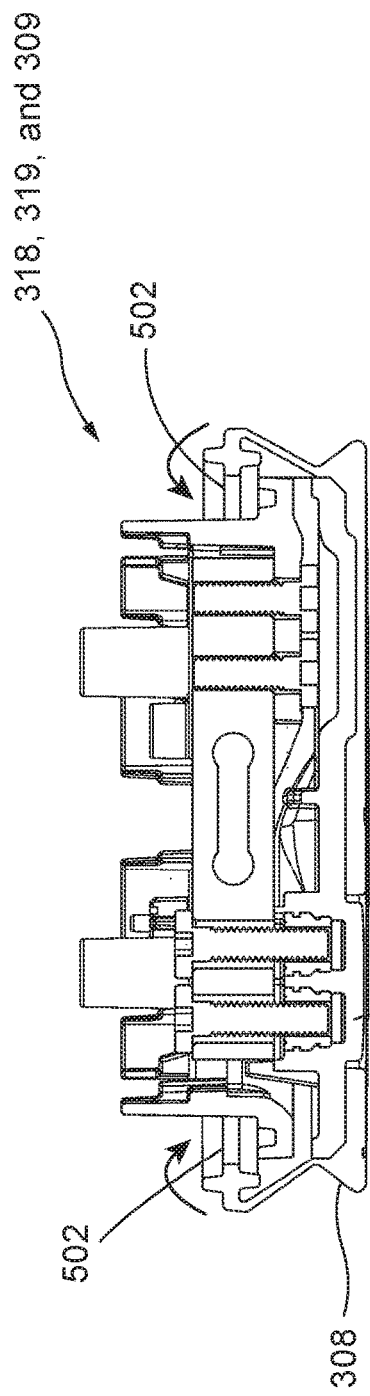
FIG. 5C shows the attachment of the silicone membrane to the upper plate assembly of the light puck.
Figure 5D:
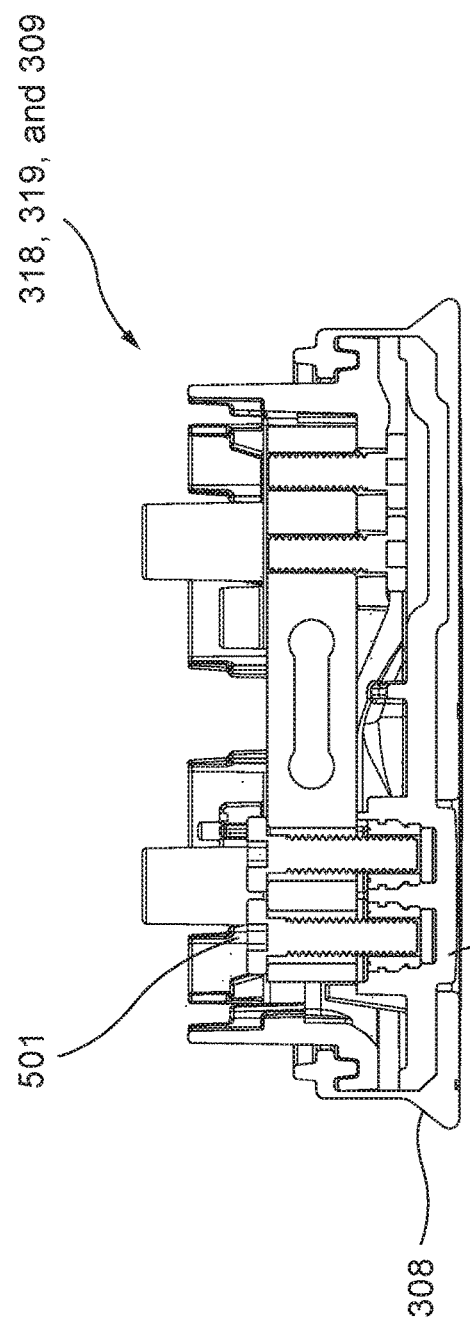
FIG. 5D shows the attachment of the load cell and upper plate assembly to the lower plate of the light puck.

FIGS. 5A-5F show the assembly of the light puck 104. The base plate 319 contains a glass-filled nylon (GFPA) substrate lower plate 307 and a silicone membrane 308. The silicone membrane 308 is permanently over-molded with a bond to the hard plastic lower plate 319 as shown in FIG. 5A. The bond may be water-tight or water-resistant and/or air-tight or air-permeable. The silicone membrane 308 can be elastically stretched open to accommodate for the load cell 309 and upper plate 318 assembly. The load cell 309 and upper plate 318 are held together using a machine screw. The load cell 309 and upper plate 318 assembly are connected to the base plate 319 using molded brass inserts 500 as shown in FIG. 5B. The silicone membrane 308 is looped over and into an upper plate perimeter channel 502 as shown in FIG. 5C. The load cell 309 and upper plate 318 assembly is mechanically fastened at 501 to the lower plate as shown in FIG. 5D. The lower plate 307 supports the load cell 309 and upper plate 318 assembly via the cantilevered load cell 309. The load cell 309 is constrained to the lower plate 319. The contents of the container 102 are supported by the upper plate 318 and are suspended over the base plate 319 via the load cell 309, allowing weight measurements of the contents in the smart container to be taken. The upper plate 318 is constrained concentrically with the silicone membrane 308 and to the upper surface of the load cell 309.

Figure 5E:
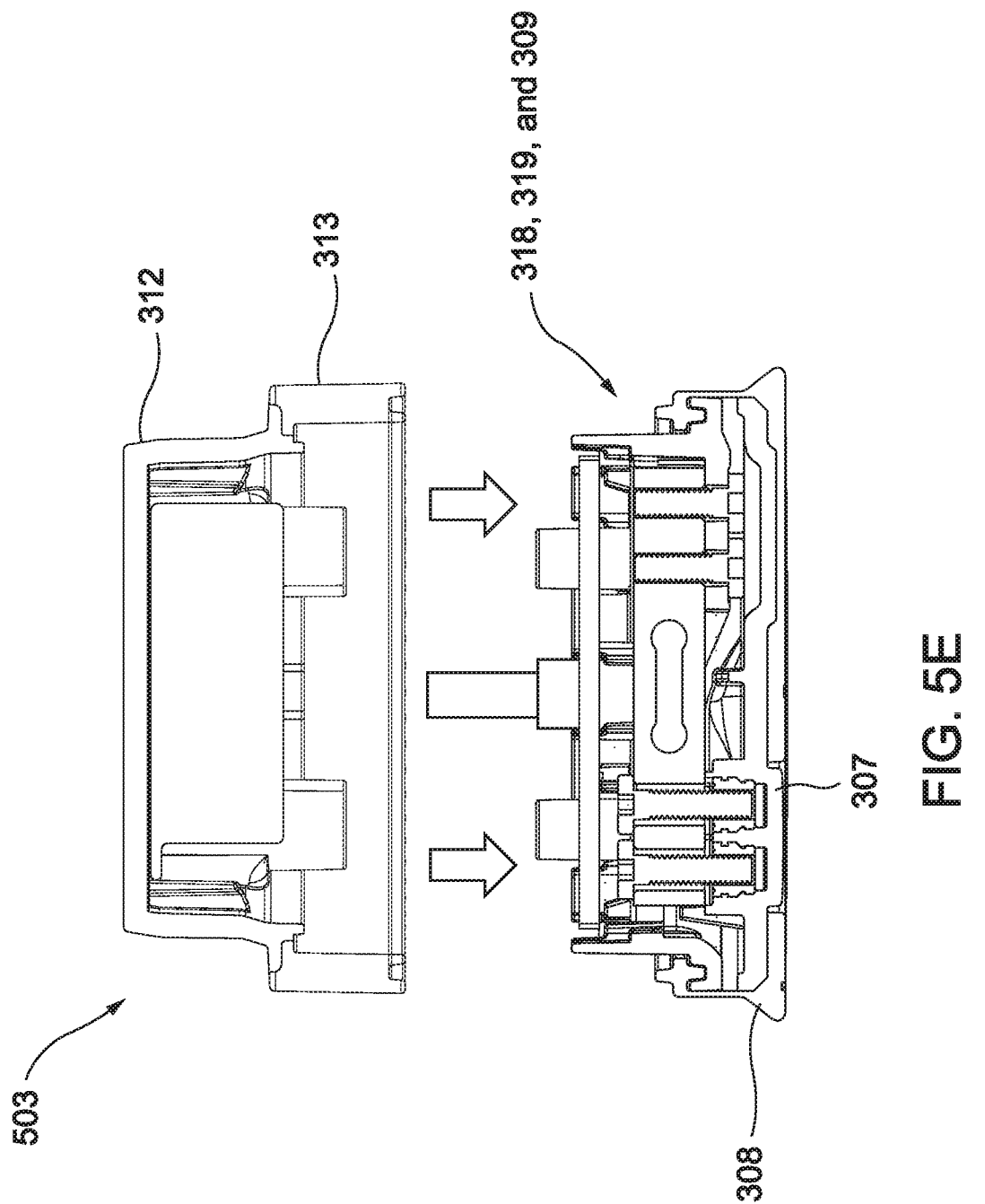
FIG. 5E shows the attachment of the puck housing to the upper plate of the light puck.
Figure 5F:
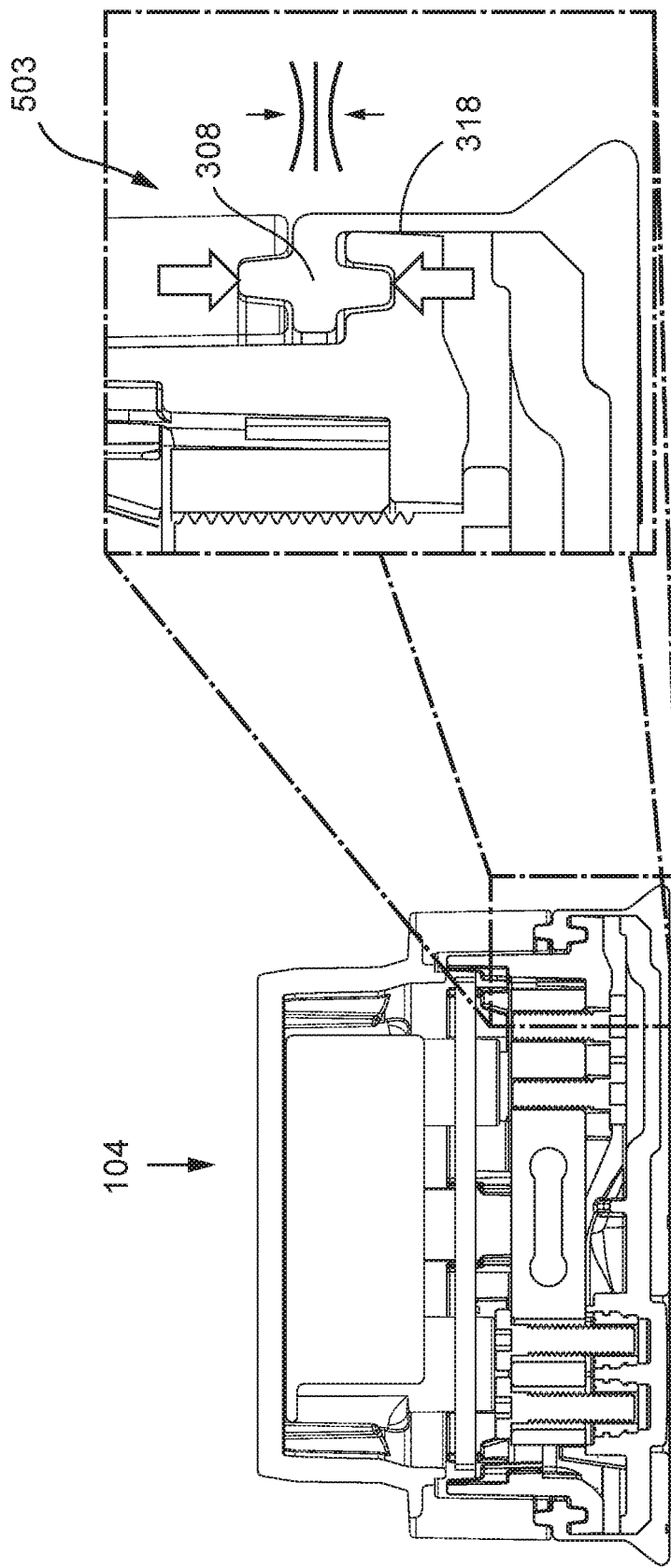
FIG. 5F shows the assembled light puck.

FIG. 5E shows the attachment of the puck housing 503 to the upper plate 318. The puck housing 503 includes the top opaque housing 312 and the clear pass-through plastic window 302. The clear pass-through plastic window 302 is over-molded to the top opaque housing 312. The puck housing 503 is assembled to the upper plate 318 via a thread-forming screw. A channel at the base of the clear pass-through plastic window 302 acts to compress to silicone membrane 308 edge against the upper plate 318, thus sealing the system from the top. The puck housing 503 fastens to the upper plate 318, compressing and locking the silicone membrane 308 within the assembly. This ensures an air and watertight seal. Three additional silicone O-rings (not shown) are used to ensure no air passage through the screw hole bosses in the puck housing 503. An adhesive, e.g., an epoxy or a silicone, seals off air passages where the pogo pins 315 pass through the puck housing 503. FIG. 5F shows the assembled light puck 104. The seal is formed by compressing the silicone membrane 308 between the puck housing 503 and the upper plate 318 as shown in FIG. 5F. The seal may be water-tight or water-resistant and/or air-tight or air-permeable. The light puck 104 is a discrete assembly that can be removed from the container 102, for cleaning, charging a battery, or replacement. The user can wash the light puck 104 by hand or possibly in a dishwasher.

When the light puck 104 is constructed in a water-tight manner, the expansion or contraction of air within the light puck 104 as a result of an ambient temperature or pressure change may cause the light puck 104 to expand or contract minutely, resulting in a positive or negative pressure change inside the light puck 104. This internal pressure change may cause false load-cell readings as the load-cell is deflected from this expansion or contraction of the light puck 104. When the light puck 104 is water-tight, an air-permeable, water-resistant PTFE membrane is used in the construction of the puck housing 503 to allow air to enter and exit the puck. This prevents the light puck's internal pressure from changing as the light puck 104 expands or contracts due to ambient temperature or pressure changes, resulting in more accurate weight sensing by preventing or reducing deflection of the load cell due to internal pressure changes. The membrane can be made from PTFE or any other hydrophobic breathable substrate. The membrane can be attached to an external or internal light puck wall by pressure sensitive adhesive, over-molding, ultrasonic welding, press-fit, or sandwiching between mating parts.

Alternatively, an electronic barometer on the printed circuit board 320 may be used to resolve load-cell inaccuracies from internal pressure as a result of temperature in a water-tight light puck 104. Static pressure within the puck as measured by the barometer based on known ambient temperatures can be correlated and adjusted for algorithmically within the in a water-tight light puck 104 electronics.

Other versions of the bottle assembly can be configured to hold and dispense pills, food, or other substances. For instance, the bottle assembly can be configured as a smart pill container for medical adherence or compliance or a smart vitamin or food container. Instead of weighing a liquid, the load cell weighs pills, vitamins, food, or other contents of the container. As with the smart water bottle, the smart pill/food container can light up, emit sound, or vibrate to prompt the user to take a pill or eat the food.

Smart Pill Container

FIGS. 6A-6C show a pill container 602 and lid 601 coupled to a light puck 104 to form a smart pill container 600 (FIG. 6A), a pill container 602 and lid 601 detached from the light puck 104 (FIG. 6B), and the light puck 104 by itself (FIG. 6C). The pill container 602 may be a pill bottle or pill cartridge. The pill container 602 may contain pill holding compartments. The pill container 602 may come in a variety of sizes to accommodate different size and quantity of pills. For example, the pill container 602 may be a refillable cartridge that can be filled by the user or by a pharmacy. The pill container 602 may be pre-filled or manually filled. For example, the pharmacy may deliver the pre-filled pill container 602 to the user's home. The smart pill container 600 could also be set to the time at which the dose should be taken. For example, the smart pill container 600 may glow green whenever the user is supposed to take a pill (e.g., twice a day) and glow red if the user tries to take an extra pill or take a pill at the wrong time. The smart pill container 600 may hold many different colored pills, with the glows matched to the colors of the pills (e.g., blue for a blue pill, yellow for a yellow pill, and so on). Alternatively, the smart pill container 600 may have different light signals to indicate what pill to take (e.g., blinking, pulsing, or chasing). The lights, speaker, and vibration can serve as reminders to take a pill. A user can also receive recorded audio that can be sent to the smart pill container 600 from a non-user (e.g., a nurse, doctor, or relative) prompting the user to take a pill. The smart pill container may also notify a nurse, doctor, or caregiver of missed doses. The smart pill container 600 may also blink or chase if the user forgets to take a pill. It can record each instance when the user takes or doesn't take a pill for medical adherence/compliance. It may also track side effects of the medication through an application in the user's phone. These configurations for the medicine and frequency of dosage can be configured in an application in the user's phone. This information could be relayed back to the prescribing physician via a HIPAA-compliant cloud application so the doctor can monitor the user's adherence and send messages to the user promoting adherence and/or modifying prescription instructions.

The light puck 104 may be totally encapsulated inside the smart pill container 600 so that the smart pill container 600 can be cleaned between users if necessary. The light puck 104 and pill container 602 may also have RFID of NFC capabilities to communicate specific information about the contents of the pill container 602 or to communicate a schedule of medication doses to the user when the light puck 104 is inserted into pill container 602. Alternatively, the contents of the pill container 602 may be communicated to the user through an application on their phone.

Smart Food Container

FIGS. 7A-7C show a food container 702 and lid 701 coupled to a light puck 104 to form a smart food container 700 (FIG. 7A), a food container 702 and lid 701 detached from the light puck 104 (FIG. 7B), and the light puck 104 by itself (FIG. 7C). The food container 702 may be refillable that can be filled by the user or by a nutritionist. The food container 702 may be pre-filled or manually filled. For example, a nutritionist or meal-kit company could deliver a pre-filled food container 702 to the user's home. The smart food container 700 can be used to weigh the contents of the food to track the amount eaten. The lights, speaker, and vibration can serve as reminders to eat or indicate the state of the food (e.g., if the food has expired or if it is still fresh). Green could mean the food is still fresh, red could mean the food has expired. All of this information can be visible to the user and relayed back to a phone wirelessly coupled to the smart food container 700 through an application on the user's phone. It could also be relayed to a health coach or trainer to monitor a client's food intake and help with nutrition guidelines. The light puck 104 and food container 602 may also have RFID of NFC capabilities to communicate specific information about the contents of the food container 702 or to communicate a nutrition schedule to the user when the light puck 104 is inserted into food container 702. Alternatively, the contents of the food container 702 may be communicated to the user through an application on their phone.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A container assembly comprising:
   a container with a cavity at a base of the container, wherein the cavity extends upward into the base of the container;
   a detachable electronics assembly configured to fit securely within the cavity, the detachable electronics assembly comprising:
      a load cell to measure a weight of contents of the container;
      an accelerometer to measure acceleration of the container;

a processor, operably coupled to the load cell and the accelerometer, to prompt the load cell to measure the weight of the contents of the container in response to the acceleration measured by the accelerometer and to determine a change in the weight of the contents of the container based on the weight of the contents of the container measured by the load cell; and a colored light source, operably coupled to the processor, to emit colored light, the colored light indicating at least one of the change in the weight of the contents of the container or a prompt to a user to consume at least a portion of the contents of the container; and an annular diffuser, coupled to the base of the container and defining at least a portion of the cavity to diffuse the colored light over an area viewed by the user.

2. The container assembly of claim 1, wherein the container comprises at least one of a liquid container, a pill container, or a food container.

3. The container assembly of claim 1, wherein the load cell is configured to measure the weight in response to an indication from the accelerometer that the container is upright.

4. The container assembly of claim 1, wherein the colored light source comprises colored light-emitting diodes (LEDs).

5. The container assembly of claim 4, wherein the colored LEDs are configured to emit unique illumination patterns.

6. The container assembly of claim 1, wherein the annular diffuser is permanently attached to the container.

7. The container assembly of claim 1, wherein the annular diffuser contains a pair of concentric layers.

8. The container assembly of claim 1, wherein detachable electronics assembly is configured to screw into the cavity at the base of the container.

9. The container assembly of claim 8, wherein the detachable electronics assembly further comprises:
a lower plate;
an elastic membrane bonded to the lower plate; and
a housing comprising an upper plate and a window disposed in front of the colored light source.

10. The container assembly of claim 9, wherein the load cell is held within the detachable electronics assembly by compressing the elastic membrane between the housing and the lower plate.

11. The container assembly of claim 9, wherein the detachable electronics assembly is water resistant.

12. The container assembly of claim 1, further comprising:
a speaker configured to emit unique sound notifications.

13. The container assembly of claim 1, further comprising:
an actuator configured to emit unique vibration patterns.

14. The container assembly of claim 1, further comprising:
an antenna operably coupled to the processor and configured to transmit data to, receive user preferences from, and/or receive commands from an external device.

15. The container assembly of claim 1, further comprising:
at least one of a radio-frequency identification (RFID) tag or a near-field communication (NFC) tag, disposed in or on the container assembly, to communicate with an external device.

16. A method of tracking consumption by a user of a substance held in a container, the method comprising:

measuring an acceleration of the container with an accelerometer coupled to the container;
determining that the container is upright based on the acceleration;
in response to determining that the container is upright, performing a measurement of a weight of the substance in the container with a load cell;
determining a change in the weight of the substance in the container based on the measurement of the weight of the substance; and
emitting colored light from a colored light source via an annular diffuser coupled to a bottom of the container in response to the change in the weight of the substance in the container, wherein the annular diffuser defines a cavity at a base of the container and the cavity is configured to receive a detachable electronics assembly, the detachable electronics assembly comprising:
the load cell;
the accelerometer;
a processor, operably coupled to the load cell and the accelerometer, to prompt the load cell to measure the weight of the substance in the container in response to the acceleration measured by the accelerometer and to determine the change in the weight of the substance in the container; and
the colored light source.

17. The method of claim 16, wherein the detachable electronics assembly is a water resistant or water-tight assembly configured to screw into the cavity at the base of the container, and further comprising:
removing the detachable electronics assembly from the container.

18. A bottle assembly comprising:
a container;
a ring-shaped translucent cap permanently coupled to a base of the container and defining a cavity at the base of the container, wherein the cavity extends upward into the base of the container; and
a cylindrical water-resistant or water-tight assembly detachably fit within the cavity, the cylindrical water-resistant or water-tight assembly comprising:
a load cell to measure a weight of contents of the container;
an accelerometer to measure acceleration of the container;
a processor, operably coupled to the load cell and the accelerometer, to prompt the load cell to measure the weight of the contents of the container in response to the acceleration measured by the accelerometer and to determine a change in the weight of the contents of the container based on the weight of the contents of the container measured by the load cell; and
colored lights, operably coupled to the processor and disposed circumferentially about the cylindrical water-resistant or water-tight assembly, to emit colored light through the ring-shaped translucent cap in response to the change in the weight of the contents of the container.

19. The bottle assembly of claim 18, wherein the ring-shaped translucent cap is configured to diffuse the colored light emitted by the colored lights.

20. The bottle assembly of claim 18, wherein the ring-shaped translucent cap comprises a diffusive inner ring concentric with a translucent outer ring.

21. The bottle assembly of claim 18, wherein the cylindrical water-resistant or water-tight assembly further comprises:

a base plate to support the load cell;

a printed circuit board to support the processor and the colored lights;

a housing fitting over the printed circuit board, the housing having transparent windows to transmit the colored light from the colored lights; and an elastic membrane compressed between the base plate and the housing to create a water-tight or water-resistant seal around the printed circuit board and the load cell.

22. The bottle assembly of claim 21, wherein the cylindrical water-resistant or water-tight assembly further comprises:

a mid-plate held in place over the load cell and against the base plate by the elastic membrane.

23. The bottle assembly of claim 18, wherein the cylindrical water-resistant or water-tight assembly further comprises:

at least one of a radio-frequency identification (RFID) tag or a near-field communication (NFC) tag to communicate with an external device.

24. The container assembly of claim 4, wherein the colored LEDs are configured to emit light radially outward from the container assembly through the annular diffuser when the detachable electronics assembly is secured within the cavity.

25. The container assembly of claim 7, wherein the pair of concentric layers comprises two polycarbonate rings, the two polycarbonate rings comprising an inner ring and an outer ring.

26. The container assembly of claim 25, wherein the outer ring is molded over the inner ring.

27. The container assembly of claim 25, wherein the inner ring comprises a diffuser additive.

28. The container assembly of claim 15, wherein the at least one of a radio-frequency identification (RFID) tag or a near-field communication (NFC) tag enable the user to track at least one of the contents of the container or a size of the container.

29. The bottle assembly of claim 18, wherein the colored lights are further configured to emit unique illumination patterns to prompt a user to consume at least a portion of the contents of the container.

30. The bottle assembly of claim 20, wherein the translucent outer ring is molded over the diffusive inner ring.

* * * * *